US008532095B2

(12) United States Patent
Mammoliti et al.

(10) Patent No.: US 8,532,095 B2
(45) Date of Patent: Sep. 10, 2013

(54) TECHNIQUES CONFIGURING CUSTOMER EQUIPMENT FOR NETWORK OPERATIONS FROM PROVIDER EDGE

(75) Inventors: Vincent John Mammoliti, Mississauga (CA); John Mullooly, Colts Neck, NJ (US)

(73) Assignee: Cisco Technology, Inc., San Jose, CA (US)

( * ) Notice: Subject to any disclaimer, the term of this patent is extended or adjusted under 35 U.S.C. 154(b) by 2058 days.

(21) Appl. No.: 11/282,530

(22) Filed: Nov. 18, 2005

(65) Prior Publication Data

US 2007/0115962 A1 May 24, 2007

(51) Int. Cl.
*H04L 12/28* (2006.01)

(52) U.S. Cl.
USPC .......................................... 370/389; 370/401

(58) Field of Classification Search
USPC ................. 370/474, 465, 467, 352, 401, 475, 370/392, 235, 351, 389, 419, 402; 709/232, 709/221, 220, 230, 218, 224, 227, 228
See application file for complete search history.

(56) References Cited

U.S. PATENT DOCUMENTS

| | | | |
|---|---|---|---|
| 5,794,032 A | 8/1998 | Leyda | |
| 6,055,227 A | 4/2000 | Lennert et al. | |
| 6,587,874 B1 | 7/2003 | Golla et al. | |
| 7,421,483 B1 * | 9/2008 | Kalra | 709/220 |
| 2003/0061339 A1 * | 3/2003 | Benfield et al. | 709/224 |
| 2003/0093287 A1 * | 5/2003 | Lowery | 705/1 |
| 2003/0140131 A1 * | 7/2003 | Chandrashekhar et al. | 709/223 |
| 2004/0052263 A1 * | 3/2004 | Xu | 370/399 |
| 2004/0202199 A1 * | 10/2004 | Fischer et al. | 370/474 |
| 2004/0205159 A1 * | 10/2004 | Johnson et al. | 709/218 |
| 2004/0210649 A1 | 10/2004 | Bhogal | |
| 2005/0108369 A1 | 5/2005 | Sather et al. | |
| 2007/0086429 A1 * | 4/2007 | Lawrence et al. | 370/351 |
| 2008/0127316 A1 * | 5/2008 | Golan et al. | 726/5 |

FOREIGN PATENT DOCUMENTS

| | | |
|---|---|---|
| CN | 101379765 | 3/2009 |
| EP | 1949623 | 7/2008 |
| WO | WO 02/03616 | 1/2002 |
| WO | WO 03/026255 | 3/2003 |
| WO | WO 2008/054428 A2 | 5/2008 |

OTHER PUBLICATIONS

NPL: Document RFC 2516, published Feb. 1999. See whole Document.*

(Continued)

*Primary Examiner* — Hassan Phillips
*Assistant Examiner* — Siren Wei
(74) *Attorney, Agent, or Firm* — Patent Capital Group

(57) ABSTRACT

Techniques for configuring customer premises equipment for communication with a provider network include establishing a physical layer network connection between a particular customer node and a first provider node. The particular customer node is an intermediate network node on a customer premises. The first provider node is an intermediate network node on a first provider network of a first service provider different from the customer. Configuration data for one or more network interfaces on the particular customer node are automatically received through the physical layer network connection. The particular customer node is automatically configured based on that configuration data. The automatic provisioning of the customer node allows equipment to be more economically shipped and installed at customer premises and allows upgraded or replacement equipment to be more economically swapped in place of equipment previously installed. Traffic management data can also be automatically received and used at the particular customer node.

49 Claims, 7 Drawing Sheets

(56) References Cited

OTHER PUBLICATIONS

International Search Report mailed Jul. 16, 2008 for International Application No. PCT/US06/60633, 3 pages.
International Preliminary Report on Patentability issued Aug. 12, 2008 (1 page) and Written Opinion of the International Searching Authority mailed Jul. 16, 2008 (4 pages) for International Application No. PCT/US06/60633.
EPO Aug. 22, 2012 Response to Written Opinion from European Application No. 06851943.8; 18 pages.
PRC Aug. 15, 2012 SIPO Third Office Action from Chinese Application No. 200680043243.7; 11 pages.
PRC Feb. 13, 2012—SIPO Second Office Action from Chinese Application No. 200680043243.7, 11 pages.
PRC Apr. 28, 2012 Response to SIPO Second Office Action from Chinese Application No. 200680043243.7; 73 pages.
PRC Jan. 25, 2011—SIPO First Office Action from Chinese Application No. 200680043243.7, 24 pages.
PRC Jun. 9, 2011 Response to SIPO First Office Action dated Jan. 25, 2011 from Chinese Application No. 200680043243.7 [Translated Claims only]; 36 pages.
EPO Feb. 2, 2012 Supplementary Search Report and Written Opinion from European Application No. 06851943.8; 10 pages.

\* cited by examiner

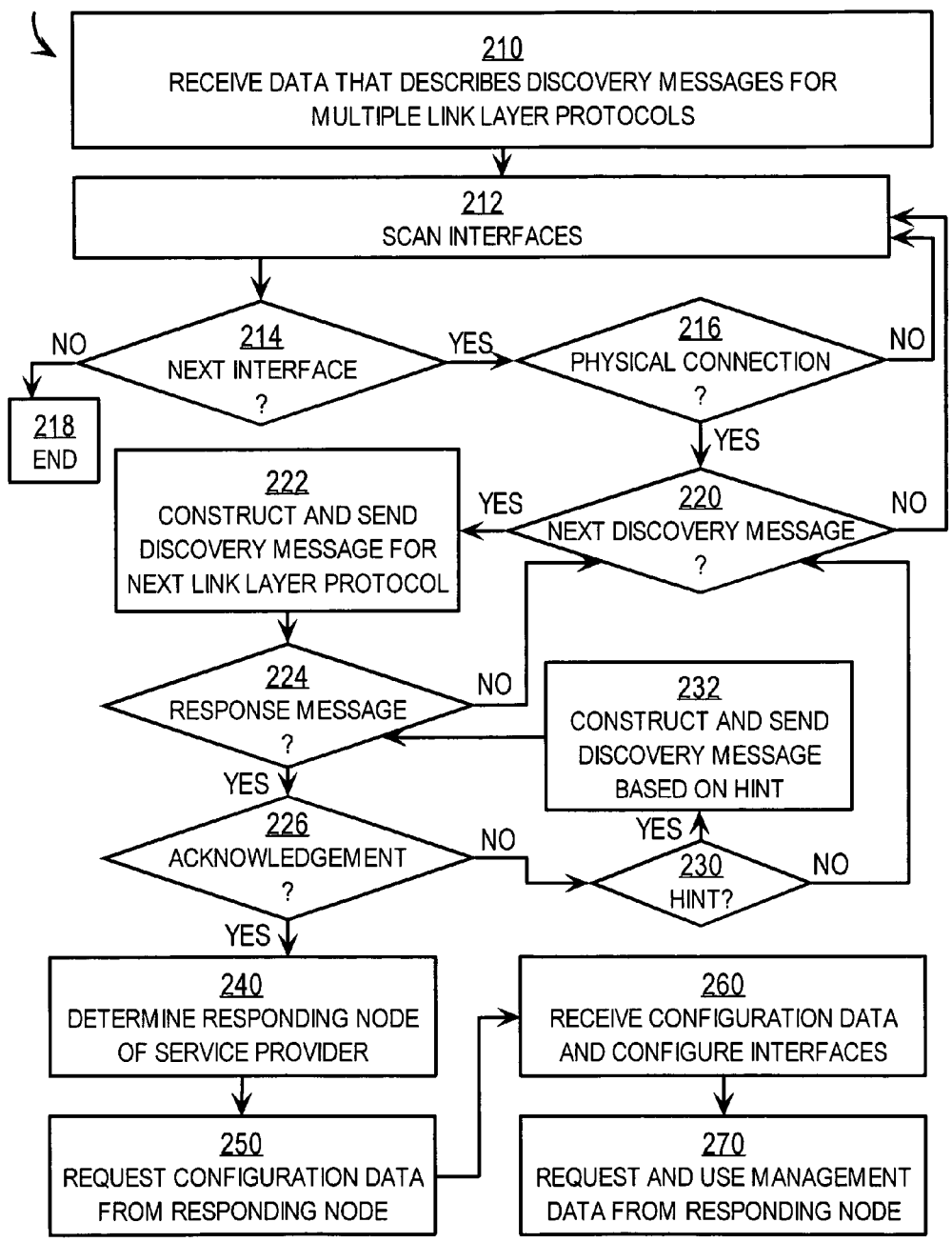

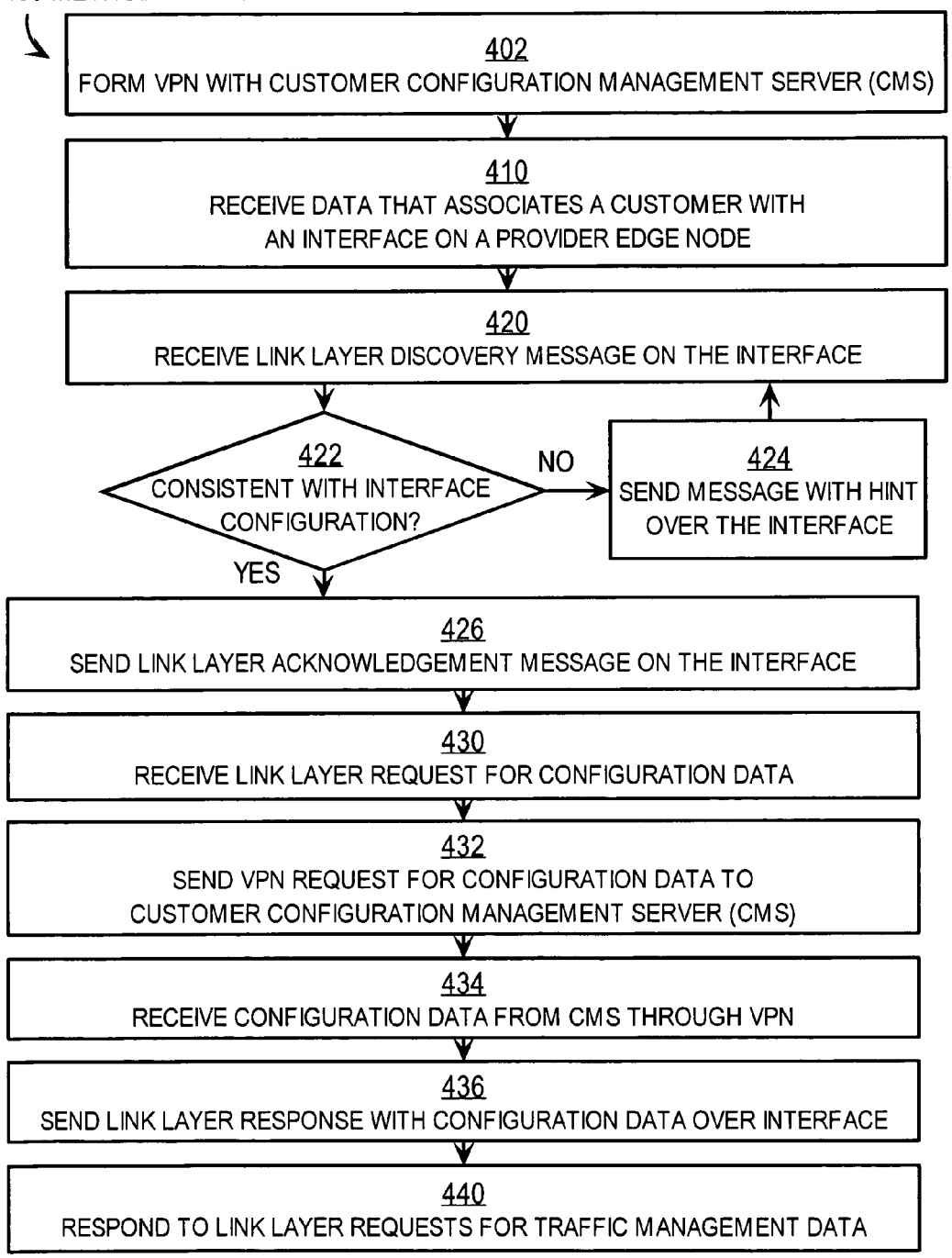

TECHNIQUES CONFIGURING CUSTOMER EQUIPMENT FOR NETWORK OPERATIONS FROM PROVIDER EDGE

BACKGROUND OF THE INVENTION

1. Field of the Invention

The present invention relates to configuring a customer premises network node for network operations with a provider network; and, in particular, to using a network service provider edge node to configure a customer premises node in a communications network without pre-configuring the customer premises node with a network address of a configuration server on the provider network.

2. Description of the Related Art

Networks of general purpose computer systems and other devices connected by external communication links are well known and widely used in commerce. The networks often include one or more network devices that facilitate the passage of information between the computer systems and other devices. A network node is a network device or computer system or other device connected by the communication links.

Information is exchanged between network nodes according to one or more of many well known, new or still developing protocols. In this context, a "protocol" consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, usually higher layer of the OSI Reference Model. The header for a particular protocol typically indicates a type for the next protocol contained in its payload. The payload protocol is said to be encapsulated in the header protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. An end node initiates or terminates a communication, and an intermediate network node facilitates the passage of packets between end nodes.

The physical (layer 1) header defines the electrical, mechanical and procedural mechanisms for proper capture of data on the interface, such as an Ethernet interface, a serial interface for point to point communications, a dial-up interface, a digital subscriber line (DSL) interface, a coaxial cable interface, or an optical fiber interface. A network interface contains the mechanical, electrical and signaling circuitry and logic used to couple a network node to one or more physical links. A network interface is often associated with a hardware-specific address, known as a media access control (MAC) address.

The data-link header provides information for transmitting the packet over a particular link that uses any physical medium. An intermediate network node typically contains multiple physical links with multiple different nodes. To that end, the data-link header may specify a pair of "source" and "destination" network interfaces that are connected by the physical link. Accordingly, the source and destination network interfaces in the data-link header are typically represented as source and destination MAC addresses. The data-link header may also store flow control, frame synchronization and error checking information used to manage data transmissions over the physical link. There are several data link protocols well known in the art, including, but not limited to, Point to Point Protocol (PPP), Frame Relay (FR), Asynchronous Transfer Mode (ATM), High Level Data Link Control (HDLC) and Ethernet.

The internetwork header provides information defining the source and destination address within the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

In many internetworking scenarios, a local area network (LAN) on one premises of an enterprise, is to be connected to a wide area network (WAN) of a service provider different from the enterprise. The connection is established for any number of reasons. Typical reasons for the connection include obtaining access to the public Internet, and obtaining private access to another LAN at a different premises of the same or a different enterprise. From the service provider's point of view, the enterprise with a LAN is a customer.

The connection involves connecting an intermediate network node on the customer's LAN to an intermediate network node at the edge of the provider's network, a so-called provider edge (PE) node. The intermediate network node on the customer's LAN connected to the PE is the customer premises equipment edge node (designated herein as the CE node).

When a customer determines to connect its LAN to the service provider network, the customer procures a CE with multiple interfaces, some of which are to be connected to nodes on the LAN and one or more of which are for connecting to one or more PE nodes on corresponding WANs. One or more interfaces on the procured CE must be configured for the connections to the PE node and one or more interfaces must be configured for connection to corresponding nodes in the LAN. The configuration data indicates the physical media, the protocols, and the protocol parameter values used to process information at each interface. Configuration data includes the physical access technologies, such as DSL, T1 or Fractional T1 leased lines, access speeds, serial encapsulation type (i.e. FR, PPP, etc.), special services, routing protocols to be used between PE and CE, encryption and other security services enabled on the CE and class of service in terms such as guaranteed minimum bandwidth, minimum latency, and maximum jitter. An example of configuration data includes data that indicates Border Gateway Protocol (BGP) is used between the PE and CE for IP route prefix exchange. The BGP process needs to be explicitly configured on each device with specific parameters such as neighbor IP address, authentication method, Autonomous System Number (ASN) and specific network prefixes to be advertised. All of this unique data for this single CE site is stored locally in the CE's on-board RAM in a "configuration" database after it has been manually input or manually downloaded. In general, the configuration is done by providing values for various options in data read by operating system software that controls the CE. The data can be provided manually or copied from templates of data for different classes of devices that serve as a CE. The selected data values are typically provided by expert network technicians, called system engineers, who understand the needs and topology of the customer LAN as well as the capacities and topology of the provider PEs.

Network service providers have begun to provide CE management services by which the service provider configures the CE for the customer when the customer signs up for the service. Thus, the customer need only connect the CE node device physically to the communications media when the CE node device arrives at the customer premises. The customer can then concentrate on the customer's own core business goals and need not field high levels of network expertise.

A challenge for service providers in providing CE management services is the variability and complexity of customer networking requirements, and the flexibility offered by different hardware and software platforms to serve as the CE node. A single customer is likely to desire different configurations using different platforms at different customer premises.

In one approach, a skilled technician from the service provider accompanies the CE node device to the customer premises and installs and configures the device for the customer This approach is expensive in technician time and travel and introduces delays as devices otherwise ready are not shipped until there are technicians available to accompany them.

In another approach, the CE node device is configured in a staging center before the CE node device is shipped to the customer premises. This allows the high level of network expertise to be concentrated at the staging center, which can be located at the service provider's site, or the site of the vendor or manufacturer for the CE node device used by the service provider. With this approach, a systems engineer is required to provide all the premises-by-premises configuration files to the staging center for installation of configuration data before shipment of the devices.

There are some disadvantages with the staging center approach. One disadvantage is that the staging center is often different from the manufacturing locations, so a device is manufactured, packed and shipped to the staging center. At the staging center, the device is unwrapped, configured, re-packed, and re-shipped to the customer premises. This double handling adds to the delay and the cost of supplying the managed CE node.

Another disadvantage arises when the systems engineer has not completed the final configuration files. In some such cases, the staging process is delayed until the systems engineer completes the determination of the configuration files. In some cases, the CE node device is shipped with a minimal configuration, and a system engineer then follows up with an on-premises visit to complete the configuration. For example, it is common that the virtual circuit identifiers associated with traffic on certain interfaces are not yet allocated in time for the staging process.

Another disadvantage arises when a systems engineer has composed configuration data using a text-editor and has introduced typographical errors. At the staging center, an error or exception will occur. The device is then put aside until the problem can be diagnosed, thus further delaying the delivery of a configured device to the customer premises.

Another disadvantage arises when the device is configured based on erroneous information from the customer. With managed CE node device deployments to large corporations with geographically dispersed premises, it is easy to introduce misinformation about the types and sizes of LANs to be connected to the CE nodes. For example, a device configured for a statically assigned internet protocol (IP) addresses is shipped to a location where the network service provider (SP) expects to assign an IP addresses dynamically. As another example, the SP requires the CE device to connect with Frame Relay protocol but the device is erroneously configured for HDLC Protocol. To deal with such errors, the service provider must dispatch a technician to the customer premises to change the staged configuration.

Another disadvantage arises because a pre-configured device in the staging is not fungible with another device of the same model that is not configured or is configured for a different customer or customer premises. There is an increased chance for an error in which the correctly pre-configured device is shipped to the wrong location or marked for the wrong LAN.

In another approach, a CE node device is configured at a staging center with an internetwork layer address of a configuration server for that customer premises. The configuration server is a host device in the network that can be accessed to retrieve the full configuration file for the CE. This approach suffers from the same delays of double handling experienced by the approach that employs full configuration at the staging center. If multiple configuration servers are used, this approach also suffers the increased chance of shipping the device to the wrong destination for which its configuration server does not have configuration data.

Another disadvantage of this approach is that the configuration server cannot be changed without a manual change to the address of the configuration server, often executed by a visit of a highly skilled technician to the customer premises, and the associated costs.

Based on the foregoing description, there is a clear need for techniques to allow a customer premises edge (CE) node to be physically connected to a wide area network (WAN) and configured automatically through the WAN connection without pre-configuration. More specifically, there is a need for a true plug and play CE node device for use at customer premises.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram that illustrates at a high level a method on a customer edge (CE) node for obtaining configuration data, according to an embodiment;

FIG. 4 is a flow diagram that illustrates at a high level a method on a PE node for obtaining configuration data for a CE node, according to an embodiment;

DETAILED DESCRIPTION

Figure 1:
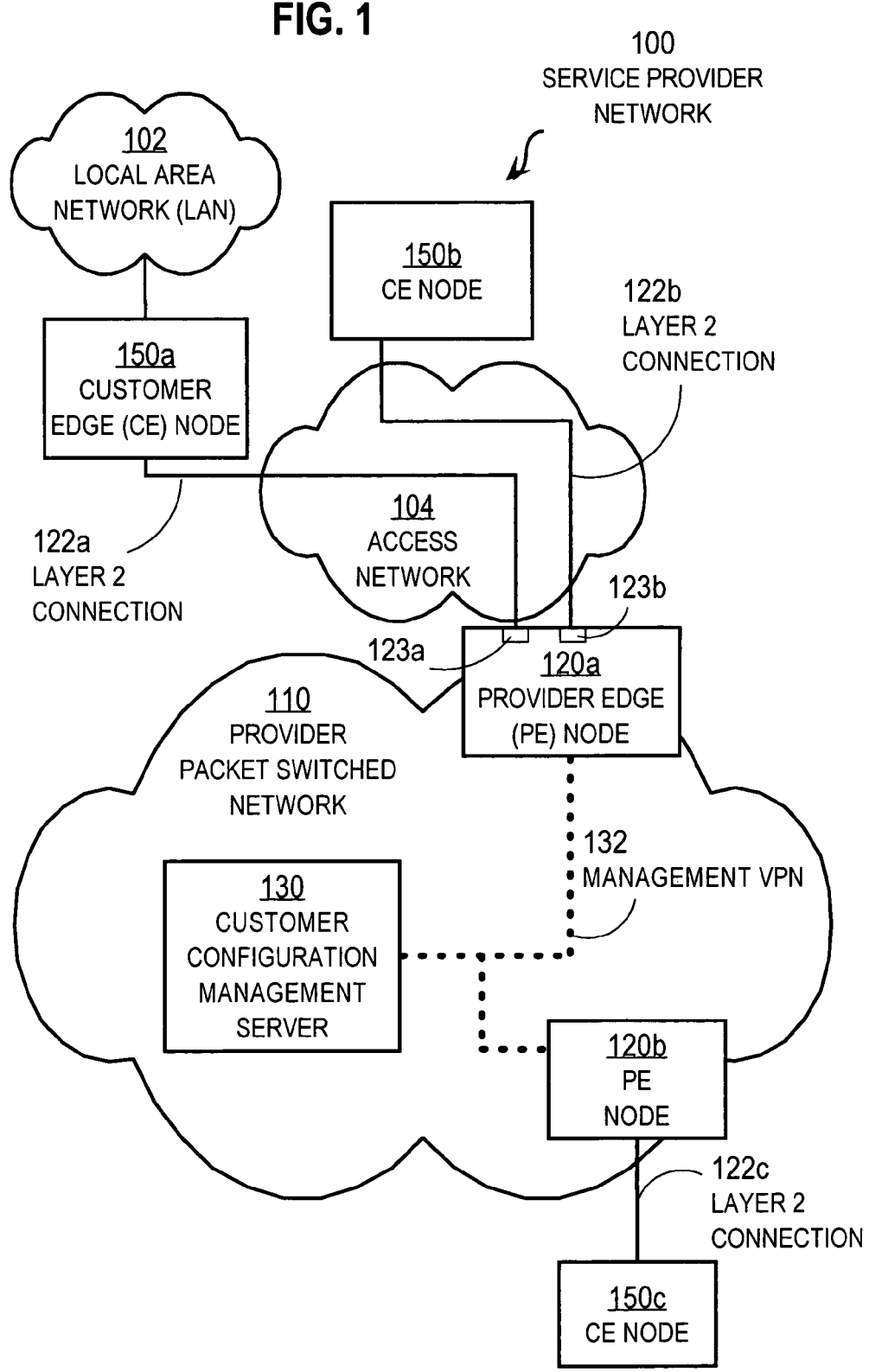
FIG. 1 is a block diagram that illustrates a provider packet-switched network for both configuring and networking with customer equipment, according to an embodiment.

A method and apparatus are described for configuring customer edge (CE) nodes from a service provider network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Certain embodiments of the invention are described in the context of a customer equipment edge (CE) node connected directly to a provider edge (PE) node of a provider network for a provider who manages the CE node and obtaining configuration data from a single customer configuration management server (CMS). However, the invention is not limited to this context. In other embodiments more CMSs are used to configure more or fewer CEs connected directly or indirectly to PEs. In some embodiment, the CMS is managed by the service provider such that configuration files for multiple end customers (CEs) are virtually stored on it, with the service provider handling the appropriate security authorization per customer to prevent one customer from accessing another customer's configuration. In other embodiments, each CMS is a server dedicated alone to one customer and either is managed by the service provider or is managed by commands received from the customer.

The client-server model of computer process interaction is widely known and used in commerce. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

1.0 Example Service Provider Network

In network parlance, a protocol that carries data, including the header and payload of another protocol, encapsulates that data. The common encapsulating protocols widely known and used in the art include the Point to Point Protocol (PPP), Frame Relay protocol (FR), Asynchronous Transfer Mode protocol (ATM), High-level Data Link Control protocol (HDLC) and Ethernet.

A PE interface to customer edge equipment (CE) is called an attachment circuit (AC) or port. Each physical interface can support one or more logical attachment circuits. For example, a single physical interface can support multiple ATM virtual circuits, which may be directed to different virtual private networks (VPNs) or different interfaces on other intermediate nodes; each ATM virtual circuit is considered a different attachment circuit. Different virtual circuits may be connected in the CE to the same or different interfaces with the customer's LAN. Configuration data specifies values for one or more parameters for each physical interface and virtual circuit. The parameters and values depend on the protocols to be used to transport data and control signals and the expected traffic demands.

FIG. 1 is a block diagram that illustrates a provider packet-switched network (PSN) for configuring and networking with customer equipment, according to an embodiment. The provider PSN 110 includes one or more edge nodes, e.g., PE 120a, 120b (collectively referenced hereinafter as PE 120). Each PE 120 includes one or more physical interfaces to which customer premises equipment (CE) may be connected, either directly or through an access network 104 (such as DSL over telephone wires) provided by a different party. Two interfaces 123a, 123b are depicted for PE node 120a. Each physical interface supports one physical or one or more logical attachment circuits (ACs) used by the customer to communicate over network 110, or both. Of the multiple logical ACs possible at each PE physical interface, one link layer (layer 2) connection is depicted in FIG. 1. For example, link layer connection 122a connects CE node 150a to interface 123a on PE node 120a. Similarly, link layer connection 122b connects CE node 150b to interface 123b on PE node 120a. Link layer connection 122c connects CE node 150c to PE node 120b through an interface (not shown) on that PE node. The link layer (layer 2) connections 122a, 122b, 122c are collectively referenced hereinafter as link layer connection 122. Also shown is customer configuration server 130 on PSN 110.

One or more CEs 150 are connected to a local area network (LAN); for exampled CE 150a is connected to customer LAN 102.

A virtual private network (VPN) is a technology to logically separate the data packets traveling over the same physical network, so that a user of one VPN does not see the data communicated between users of a different VPN. A layer 3 VPN (L3VPN) is typically provided via Multiple Protocol Layer Switching (MPLS) VPN technology and also referenced as Multi-Protocol Border Gateway Protocol (MP-BGP), described at the time of this writing in Internet Engineering Task Force (IETF) request for comments (RFC) 2547 which can be found in a file named rfc2547.txt, which can be found, along with other RFC files, at the World Wide Web domain www.ietf.org in the file directory named rfc. The entire contents of RFC 2547 are hereby incorporated by reference as if fully set forth herein.

In the illustrated embodiment, a PE is connected to a CE via a link layer circuit using the typical encapsulation technologies (FR, PPP, HDLC, ATM, Ethernet) but the circuit is terminated into a layer 3 VRF "Virtual routing and forwarding" (VRF) process on the PE. The VRF technology as outlined in RFC2547 provides virtualization of routing table between customers. PEs use MP-BGP between themselves to deliver routing information per L3VPN. Thus the end customer in essence gets a dedicated Layer 3 network which is segregated via VPN technology from other customers. The PE connecting to the customers CE is a Layer 3 routed "hop" and performs IP Layer 3 routing services. Thus the customer may have many sites connected to many PEs, but theses sites can optimally (any-to-any) communicate with each other over the VPN. Such a L3VPN is depicted in FIG. 1 as management VPN 132, which connects the CMS 130 and the PE nodes 120.

According to some embodiments of the invention, described in more detail below, each PE node 120 serves as a proxy for the customer configuration management server (CMS) 130 with respect to communications from the CE nodes 150 connected to those PE nodes 120 over link layer connections 122. In some embodiments of the invention, the functions of the CMS 130 are distributed over multiple nodes on provider network 110, such as at one or more of the PE nodes 120. In some embodiments in which the configuration data for a customer is located at the PE nodes 120, the VPN with a CMS is omitted, e.g., VPN 132 with CMS 130 are omitted.

2.0 Method to Configure Customer Edge (CE) Node

According to various embodiments of the invention, an agent for an enterprise that is a customer of a network service provider which manages the customer equipment edge (CE), receives the customer equipment and makes physical connection with a communications medium to a wide area network (WAN). For example, the agent connects a coaxial Ethernet cable from a DSL modem or coaxial cable modem or an optical cable modem to CE 150b. The equipment then uses the WAN connection to automatically discover a link layer connection with a provider edge node (e.g., PE node 120a) of the network service provider. The equipment obtains the configuration data for one or more of its LAN and WAN interfaces from the PE node. In an illustrated embodiment, the PE node serves as a proxy for the customer configuration management server (CMS) 130, so that the CE node need not know the network address of the CMS 130. Instead, the CE node discovers the PE node it is connected to, and the PE node acts as a proxy to obtain CE configuration data from the CMS 130 over a control VPN, e.g. over VPN pseudo wire 132a. Thus any device that can be physically connected to a WAN and a LAN can be used; the device need not be a device specifically configured for that location.

For example, in some embodiments, a CE node already connected to LAN 102 and PE 120a is removed and replaced by CE node 150a, which is not configured for this topology. CE node 150a then uses a link layer WAN connection 122a to discover PE node 120a and request configuration data for itself. In some embodiments, the original intermediate network node replaced by CE node 150a is discarded or sent for repair, or is used as 150b or 150c for another LAN (not shown) on the same or different customer premises.

2.1 Method at Customer Edge (CE) Node

FIG. 2 is a flow diagram that illustrates at a high level a method 200 on a customer edge (CE) node for obtaining configuration data, according to an embodiment. Although steps are shown in FIG. 2 and subsequent flow diagrams in a particular order for purposes of illustration, in other embodiments one or more steps are performed in a different order or overlap in time or are omitted or are changed in some combination of ways.

In step 210 data is received at an intermediate network node that serves as a customer equipment edge (CE) node. The data describes discovery messages for multiple protocols, including at least multiple physical layer (layer 1) and link layer (layer 2) protocols, which are used to establish a layer 2 connection with a provider edge node. The data is available upon boot-up of the device to be used as the CE node. For example, the data is received from read only memory (ROM) included in the device.

It is noted that in practically all layer 3 service provider networks there is a layer 2 connection between the CE node and PE node. For instance, if the service provider is providing Internet access service through a leased line (e.g., T1 or FT1), then there is a link layer path between the PE node and the CE node—typically using the PPP or HDLC protocol. If the service provider is providing a layer 3 virtual private network through a leased line, then there is a link layer path typically using a FR, PPP, HDLC or Ethernet VLAN protocol. If the service provider is providing a layer 3 virtual private network through a DSL or coaxial cable access network 104, then there is a link layer path typically using the ATM or PPP protocol from the CE node to the layer 3 aggregation node functioning as the PE node, such a broadband remote access server (BRAS) or a DSL access module (DSLAM) or a cable modem termination system (CMTS).

In step 212, a process on the CE node scans through each of its interfaces in turn. Each intermediate network node is equipped with a circuit to scan its interfaces.

In step 214 the next interface on the CE node is chosen. If there is no further interface to be scanned, then control passes to step 218 to end the boot up process.

If it is determined in step 214 that there is a next interface on the CE node, then control passes to step 216. In step 216 it is determined whether there is a physical connection on that interface. Any method known in the art may be used to determine whether there is a physical connection on the interface. For example, for a physical T1 port, reception of a T1 signal (either Super Frame (SF) or Extended Super Frame (ESF)) would indicate that a physical layer 1 connection has been made on that port. For an Ethernet port, the reception of electric signal on the receive line would indicate that a physical layer 1 connection has been made. If there is no physical connection, control passes back to step 212 to scan the next interface, if any.

If it is determined in step 220, that there is a physical connection, control passes to step 220 to determine the layer 2 encapsulation protocol for the link. The physical port type is already known by the line card hardware present, in that if it is an ATM line card port, then the encapsulation needing to be determined is either RFC1483 bridged or 1483 routed. If the line card is serial hardware, then the encapsulation to be determined is either Frame Relay, PPP or HDLC. The encapsulation is found by using an auto-discovery process where each protocol is enabled on the link, protocol specific messages are sent, and responses checked. For example, by rotating thru the common serial link layer protocols such as Frame Relay, PPP or HDLC, eventually the PE will respond with the proper layer 2 protocol which has been pre-provisioned on the PE. For example, it is determined that the next discovery message not tried for this interface is a FR discovery message, such as a Local Management Interface (LMI) status request. If every link layer protocol discovery message has been tried for this interface, then there is no next discovery message, and control passes back to step 212 to scan the next interface, if any.

If it is determined in step 220 that there is a next discovery message not yet used on this interface, control passes to step 222. In step 222, a test discovery message is constructed according to a particular link layer protocol based on data that describes the next discovery message. For example, a FR discovery message is constructed and sent as a LMI status request; or an HDLC KEEPALIVE packet is constructed and sent. In step 222, the constructed test discovery message is sent over the current interface. For example, the FR discovery message is forwarded over the interface.

In step 224, it is determined whether a response message is received in a reasonable time period. For example, it is assume for purposes of illustration that a reasonable time period for receiving a response message over the interface is 100 milliseconds. If a response is not receive on the interface in that time, then the discovery message is ascertained to have failed and control passes to step 220 to try the next discovery message, if any. For example, if the PE interface is a serial interface that uses PPP, then the PE is not programmed to respond to a FR discovery message, and no response is received within 100 milliseconds. Control then passes to step 220 to try a different link layer discovery message, not yet tried on this interface.

If it is determined in step 224 that a response is received, control passes to step 226 to determine whether the response is an acknowledgement response in the protocol of the discovery message. If so, control passes to step 240, described below. If not, control passes to step 230. For example, if a non-acknowledgement FR message or ATM discovery message is received in step 224, then control passes to step 230.

In step 230 it is determined whether the response message includes a hint about the link layer protocol to use to connect with the PE. For example, if the interface is connected to the PE node and the PE interface is configured for ATM, then the PE does not return a FR acknowledgement message. The CE can attempt to determine the encapsulation type by analyzing the received frame (such as RFC1483 Bridged or RFC1483 Routed framing format). In some embodiments an ATM message, such as an ATM discovery message, is sent to provide the hint that a node connected through this interface PE is reachable using ATM. In some embodiments using Frame Relay links, if the PE sends periodic LMI status enquiry packets as the hint, then the Data Link Connection Identifiers (DLCIs) used to identify the specific Permanent Virtual Circuits (PVCs) configured for that link are learned from the PE.

If it is determined in step 230 that the message received does not include a hint, then control passes back to step 220 to try the next discovery message not yet tried on this interface. For example, in step 220 it is determined to try a PPP discovery message next. If it is determined in step 230, that the message received does include a hint, control passes to step 232. In step 232, a test discovery message is constructed based on the hint. For example, a discovery message for ATM is constructed based on the hint data that indicates ATM. The constructed message would have a virtual circuit identifier based on the data received in step 210. In step 232, the constructed test ATM discovery message is sent over the interface. Control then passes back to step 224 to determine whether a response is received.

If it is determined in step 226 that an acknowledgment message for the test message protocol is received, control passes to step 240. This occurs when a PE responds to the discovery message in the correct protocol. For example, an HDLC keepalive message is received from the PE when an HDLC discovery message is sent over the interface connected to the PE. It is determined in step 226 that the response is the correct protocol, and control passes to step 240.

In step 240, the responding node of the service provider is identified in the acknowledgment message of the correct protocol, and a link layer connection 122 is established. For embodiments in which the PE is using a multiplexed port interface, the virtual circuit identifier or virtual LAN (VLAN) tag of an Ethernet link layer is used to distinguish this connection with the PE for configuration data from other connections using the same link layer protocol and same interface. For purposes of illustration, it is assumed that the link layer connection is a FR connection with a Permanent Virtual Circuit (PVC) identifier X, where X is a unique identifier (ID) for the CE device.

In step 250, the CE uses the link layer connection to request full configuration data for the CE from the responding PE node. For example, the CE node 150a sends a request for configuration data in a FR frame which is received on the PE on a specific physical port Y and virtual circuit X. The request message includes data that uniquely identifies the device serving as the CE node, such as a serial number for the device.

Figure 3A:
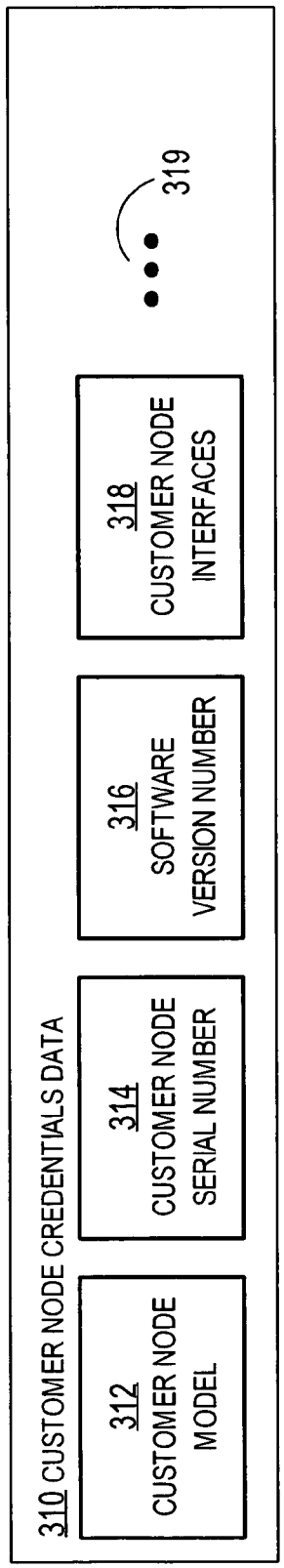
FIG. 3A is a block diagram that illustrates customer credentials data fields in a request from a customer node for configuration data, according to an embodiment.

FIG. 3A is a block diagram that illustrates customer node credentials data fields 310 in a request from a customer node for configuration data, according to an embodiment. For example, these credentials are carried in a payload of a FR frame on virtual circuit X from the CE node to the PE node. In the illustrated embodiment, the CE node credentials data fields 310 include a customer node model field 312, a customer node serial number field 314, a software version number field 316, and a customer node interfaces field 318, as well as other fields indicated by ellipsis 319. In other embodiments, more or fewer fields are used as customer node credentials fields in a request for configuration data. Although the fields are shown as integral entities in a particular order for purposes of illustration, in other embodiments, the data in these fields are spread over multiple different fields in the same or in a different order.

The customer node model field 312 holds data that indicates a model of the intermediate network node device that serves as the CE node. For example, in some embodiments the data in this field indicates a model 2600 router from Cisco Systems, Inc. of San Jose, Calif.; and in some embodiments the data in this field indicates a more powerful model 3800 router from Cisco Systems.

The customer node serial number field holds data that indicates a serial number established by the manufacturer, which is unique among all devices of the given model type. The data in fields 312, 314 uniquely identify a device among all devices that may serve as a CE node. In some embodiments, a unique device ID among devices managed by the service provider is included in the credentials data fields in place of, or in addition to, the model field 312 and the serial number field 314. The effect of the device ID is to associate the device with configuration data managed by the service provider, as described in more detail below. In some embodiments, the service provider chooses to trust the CE that is requesting configuration. Because of the point to point circuit oriented nature of the attachment circuit, it is reasonably to assume that the CE is at the other end of the data facility, and thus at the customer's physical premises. Yet, in some embodiments the service provider chooses to further validate that the CE that is expected to be at this customer's physical premises is in fact the one that was shipped from the service provider or from the manufacturers factory. In such embodiments, the customer node serial number and the requesting PE with port ID are used by the CMS to verify and ensure that the correct CE is present at this site. It some such embodiments, the serial number is previously recorded into the database of the CMS via some manual or automatic process when the unit is first shipped to the customer site. Thus a comparison is done between the serial number of the CE that was expected to be at that site with the serial number of the device that is actually requesting the configuration data.

The software version number field 316 holds data that indicates a version of software executing on the device serving as the CE node. For example, a version of the Internetwork Operating System (IOS) of Cisco Systems, Inc is indicated by data in this field.

The customer node interfaces field 318 holds data that indicates the interfaces on the device to be configured. Typically field 318 includes data that indicates multiple interfaces on the device serving as the CE node. In some embodiments all interfaces on the device are listed in this field; in some embodiments only interfaces to be configured, e.g., interfaces with live physical connections as determined in step 216, are listed in the customer node interfaces field 318. In some embodiments, the interfaces on a device are well defined based on the device model; and interfaces field 318 is omitted.

Returning to FIG. 2, the request with the customer node credentials fields 310 is sent during step 250 to the PE node through the link layer connection. For example, the CE node 150a sends a request for configuration data in a link layer connection 122a that is a FR frame of the virtual circuit X to PE node 120a. In some embodiments a link layer standard (e.g., the FR standard) is extended to include a new type of frame that indicates the link layer frame includes a request for configuration data.

In step 260, configuration data for the interfaces on the device serving as the CE node is received in a payload of the link layer protocol through the interface connected to the PE used to communicate with the PE node. For example, data is received in a FR packet on virtual circuit X. The data indicates for each interface the different layer protocols; virtual circuits, if any, for the different layer protocols; the virtual circuit identifiers for the different virtual circuits; the bandwidth for the different virtual and physical circuits; the links for each virtual circuit to other interfaces on the CE device; the quality of service guaranteed for each physical and virtual circuit; the IP routing protocols, security parameters, node name and other items, in any combination.

Also in step 260, the CE node is configured based on the configuration data received. For example, the data is stored in memory locations on the device dedicated to configuration data for retrieval and use by the device operating system. Methods for configuring network interfaces on a device from data in memory are well known in the art. Any method known at the time that method 200 is implemented may be used. In some embodiment, the configuration data received and stored during step 260 is used to configure the device upon subsequent episodes of powering up, and steps 210 through 250 are omitted. In some embodiments, steps 210 through 260 are repeated each time the device powers up, or on a regular schedule, e.g., semi-annually.

Also in step 260, in some embodiments, an updated version of the operating system software for the device is received and installed. Given that the CMS has a well established communication path to the CE (e.g., over management VPB 132), after the above initial configuration process completes, the operating system software push process can easily be accomplished. Methods for installing software updates received over a network connection are well known in the art. Any method known at the time that method 200 is implemented may be used.

In step 270, the CE node requests and uses management information available from the PE through the link layer connection. For example, the PE tracks packet loss statistics for packets communicated between the CE and other nodes on the provider network. That information is not generally available to the CE node. If many packets destined for the CE node are being dropped, e.g., because of congestion at the PE, the CE node is unaware of this condition in conventional systems. According to the illustrated embodiment, the CE node sends a request for management information, such as drop rate, in a payload of the link layer connection with the PE (e.g., in an ATM payload). In response, the PE sends back the management data. The CE then uses that management data to control its operation as circumstances warrant. For example, if the CE node (e.g., node 150a) learns that a high rate of packets are being dropped, the CE node can send a message to another end node (e.g., CE node 150c in FIG. 1) with which the CE node is communicating. The message indicates that the other end node (e.g., CE node 150c) should wait or reduce its rate of sending data packets.

Using the method 200, any device capable of serving as a CE node can be plugged into a network and configured using the WAN connection available at the time. Thus the device need not be pre-configured in a customer specific way before installation, such as in a staging center. This enables all models that can serve as a CE node to be fungible. Spares can be swapped in as needed. Any component can be replaced with an upgrade and the replaced device can be used to replace a successively less powerful device on the premises of the same or different customer, thus improving the entire customer premises suite of CE nodes in a trickle down effect. These actions can be performed with reductions in delays perceived by the customer, reductions in expenses incurred by the service providers, and reductions in the chances for error in managing CE nodes by the service provider.

2.2 Method at Provider Edge (PE) Node

In some embodiments, the PE node is configured to act as a proxy for a customer configuration management server (CMS), e.g., CMS 130. Such a PE receives a proper discovery request and responds in a conventional way. Then when the request for configuration data is received, it is passed on to the CMS. The CMS responds with configuration data based on the data in the customer node credentials fields 310 in the request. Thus, the PE node serves as a proxy for the CMS. Many methods are known in the art for a PE node to serve as a proxy for another server. Any method known at the time of implementing the invention may be used at the PE to serve as proxy for a CMS.

In some embodiments, an access network 104 is disposed between the CE and the PE. Such an access network must be configured to pass link layer discovery messages of a certain type to the PE node, such as a BRAS or CMTS. The PE node then responds to establish the particular link layer connection between the CE node and the PE node. A subsequent request for configuration data on that link layer connection is then passed on to the CMS. Again, any method known at the time of implementing the invention may be used at the PE to serve as proxy for a CMS If the CE node device as defined by the contents of the credentials fields 310 is not known at the CMS, in some embodiments the CMS is unable to respond with configuration data. For example, that device is not known to belong to a particular customer; thus the topology and protocols of the LAN are not known to the CMS and the appropriate configuration data can not be determined and sent.

According to some embodiments, when the CE node is directly connected to the PE node, the PE node can add information to the request for configuration sent to the CMS, to enable the CMS to respond with appropriate configuration data, even when the particular device serving as the CE node is not known to the CMS. This embodiment of the method at the PE node is described next with reference to FIG. 4.

FIG. 4 is a flow diagram that illustrates at a high level a method 400 on a PE node for obtaining configuration data for a CE node, according to an embodiment.

In step 402, a virtual private network (VPN) is established between the PE node and a customer configuration management server (CMS). For example, layer 3 VPN 132 is established among CMS 130 and PEs 120a, 120b. In some embodiments a layer 2 VPN is established using one or more tunneled paths called pseudo wires. In some embodiments, CMS 130 is a cluster of CMSs with a load balancing server, and the VPN is established with the load balancing server. In some embodiments with multiple CMSs for the same or geographically proximate customers, multiple VPNs are established between the PE node and multiple CMSs. For purposes of illustration it is assumed that CMS 130 holds configuration data for two customers designated customer A and customer B. It is further assumed that customer A premises include CE nodes 150a and 150c at premises 1 and premises 2, respectively, while customer B premises include CE 150b.

In step 410, data is received that indicates an association between a customer or premises or both with one or more interfaces on the PE node. In embodiments with a direct connection, there is a physical relationship between a PE node interface and a customer and premises. For example interface 123a on PE node 120a is physically connected to premises 1 of customer A and interface 123b on PE node 120a is physically connected to the premises 1 of customer B. Similarly, an interface on PE node 120b is physically connected to premises 2 of customer A. This association is valid regardless of the LANs at those premises and regardless of the devices installed at those premises to serve as CE nodes 150a, 150b, 150c.

In step 410 this relationship is stored for later use. Any method may be used to receive this data, including retrieving the data from files on the PE node, receiving the data as manual input by a human operator, receiving the data from a database on the PE node or elsewhere on the network 100, in a message communicated through the network 100 from another process or server, either in response to a prompt from the PE node or unsolicited.

In step 420 a link layer discovery message is received on the interface with a customer site. For example, a test message sent during step 222, described above, is received at interface 123a on the PE node 120a.

In step 422, it is determined whether the link layer discovery message is consistent with the configuration for the interface over which it is received. For example, if the interface 123a is configured for ATM as the link layer protocol, it is determined whether the discovery message is an ATM discovery message. If not, control passes to step 424. For example, if an FR discovery message is received on interface 123a configured for ATM, then control passes to step 424.

In some embodiments, step 422 includes determining whether the device acting as a CE node is authorized to access the provider network. Many methods to authenticate devices that send discovery messages are well known in the art, such as using an Authentication, Authorization, and Accounting (AAA) server or a Remote Authentication Dial In User Server (RADIUS) to authenticate a device attempting to access a network, as described in RFC 2138, the entire contents of which are herby incorporated by reference as if fully set forth herein. Any method known at the time an embodiment of the invention is implemented may be used.

In step 424, a non-acknowledgement message with a hint is returned over the interface on which the inconsistent discovery message was received. For example, a FR KEEPALIVE or LMI status message is returned with data in the payload that indicates the FR protocol. Control then passes back to step 420 to receive another link layer message. In some embodiments, no hint is sent in response to an inconsistent discovery message; the message is ignored, and control passes back to step 420 to await the next link layer message. In such embodiments, step 424 is omitted.

If it is determined in step 422 that a link layer discovery message is received that is consistent with the configuration on the interface, control passes to step 426. For example, if a FR KEEPALIVE message is subsequently received at interface 123a, control passes to step 426.

In step 426, an acknowledgement message is sent for the link layer discovery message.

In step 430 a request for configuration data is received in a payload of the consistent link layer protocol. For example, an ATM cell (or series of cells) is received that includes in its payload data that indicates a request for configuration data and values for the customer node credential data fields 310.

In step 432, the PE node constructs and sends a request for configuration data for the CE node to the CMS over the VPN established in step 402. For example, PE node 120a constructs and sends a CE node configuration request to CMS 130 in a layer 3 IP packet over VPN 132, based at least in part on the request received in step 430. In some embodiments, the PE node has multiple CMS node addresses configured. For example, in some embodiments, the PE sends all requests to the same CMS for all customers' connections. In some embodiments, the PE has a unique CMS node address associated with each customer port; the PE sends the configuration request to the associated CMS when at particular customer port is activated.

According to the illustrated embodiment, the request sent to the CMS includes additional information provided by the PE node. For example, the PE node 120a associates customer A premises 1 with interface 123a over which the request came. Therefore PE node 120a includes in the request sent to the CMS data that indicates the customer associated with the request, e.g., customer A. Thus, if the data in the credential data fields 310 indicate a device not recognized by the CMS, the data that indicates the customer and customer site can be used to determine a reasonable configuration for the device that serves as the CE node at that customer premises.

Figure 3B:
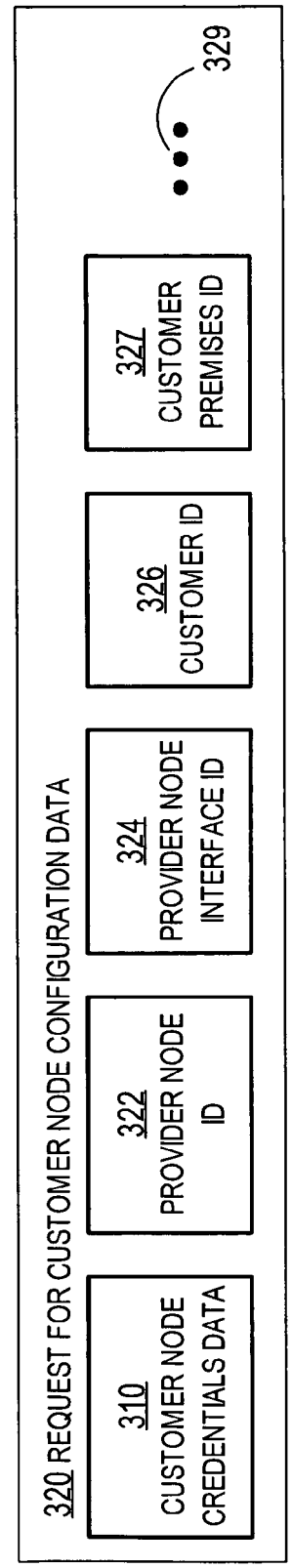
FIG. 3B is a block diagram that illustrates a request from a provider edge (PE) node for configuration data from a configuration management server (CMS), according to an embodiment.

FIG. 3B is a block diagram that illustrates a request 320 from a provider edge (PE) node for configuration data from a configuration management server (CMS), according to an embodiment. The request 320 includes the customer node credentials data fields 310, described with reference to FIG. 3A, plus a provider edge node identifier (ID) field 322, a provider edge node interface and sub-interface ID field 324, a customer ID field 326, a customer premises ID field 237, and one or more other fields indicated by ellipsis 329. In other embodiments, more or fewer fields are used in the request for configuration data. Although the fields are shown as integral entities in a particular order for purposes of illustration, in other embodiments, the data in these fields are spread over multiple different fields in the same or in a different order The provider node ID field 322 holds data that indicates a particular PE node. Any method may be used, such as a router model number and serial number for the PE node, or the IP address of the PE node, or some other unique identifier, or some combination. In some embodiments the provider node ID is an IP address already used in an IP header field and field 322 is omitted. The provider node interface ID field 324 holds data that indicates a particular interface on the PE node indicated by the PE node ID field 322. Any method may be used, such as an interface type and number, or logical sub-interface identifier in the case of multiplexed interfaces such as Ethernet VLANs and FR virtual circuits, or a media access control (MAC) number, or some other unique identifier, or some combination.

The customer ID field 326 holds data that indicates a particular customer. The customer premises ID field 327 holds data that indicates a particular customer premises. In some embodiments, the CMS has data that associates a particular customer and premises with a particular interface on a particular PE node. In some such embodiments, fields 322 and 324 suffice for indicating the customer and fields 326 and 327 are omitted Returning to FIG. 4, in step 434, a response is received from the CMS through the VPN with configuration data for the CE node. For example, a response is sent from CMS 130 to PE node 120*a* over pseudo wire 132*a* of VPN 132 with data that indicates configuration data for one or more interfaces on CE node 150*a*. Any method known in the art for sending the configuration data may be used. For example a series of layer 3 IP messages are receive from CMS that indicate for each of multiple interfaces on CE node 150*a*, one or more of the protocols used at different levels, the control plane protocols used at one or more of those levels, the virtual circuit identifiers for one or more of those protocols, the bandwidth for the interface, and the quality of service for one or more of those virtual or physical circuits.

In step 436, the configuration data is sent to the CE node using the link layer protocol consistent with the interface on the PE node connected to the CE node. For example, the configuration data is packed into a payload of a FR frame and sent over interface 123*a* to CE node 150*a*.

In the illustrated embodiment, method 400 includes step 440. In step 440, the link layer connection is used to pass management data between the CE node and the PE node. For example, the FR virtual circuit X between CE node 150*a* and PE node 120*a* at interface 123*a* is used for management information. In some embodiments, step 440 is omitted.

Using method 400, the PE node not only acts as a proxy for the CMS server, but also adds information about the customer premises where the CE node is located that is making a request for configuration data. Thus, if an unplanned device is connected to the provider network, the device can still be configured as a CE node with configuration data appropriate for the customer and premises deduced from the PE node interface. In addition, the link layer connection established to request and pass the configuration data, can also be used to request and respond with management information. In some embodiments, the PE node also passes hints to the CE node about the protocol to be used to establish a link layer connection between the PE node and the CE node.

2.3 Method at Customer Configuration Management Server (CMS)

In some embodiments, the CMS 130 performs as in the approach when the CE node is pre-configured with the IP address of the CMS 130. However, in some embodiments, the CMS performs additional steps as remedial action if the device requesting configuration data does not match a device expected at a particular customer premises.

Figure 6:
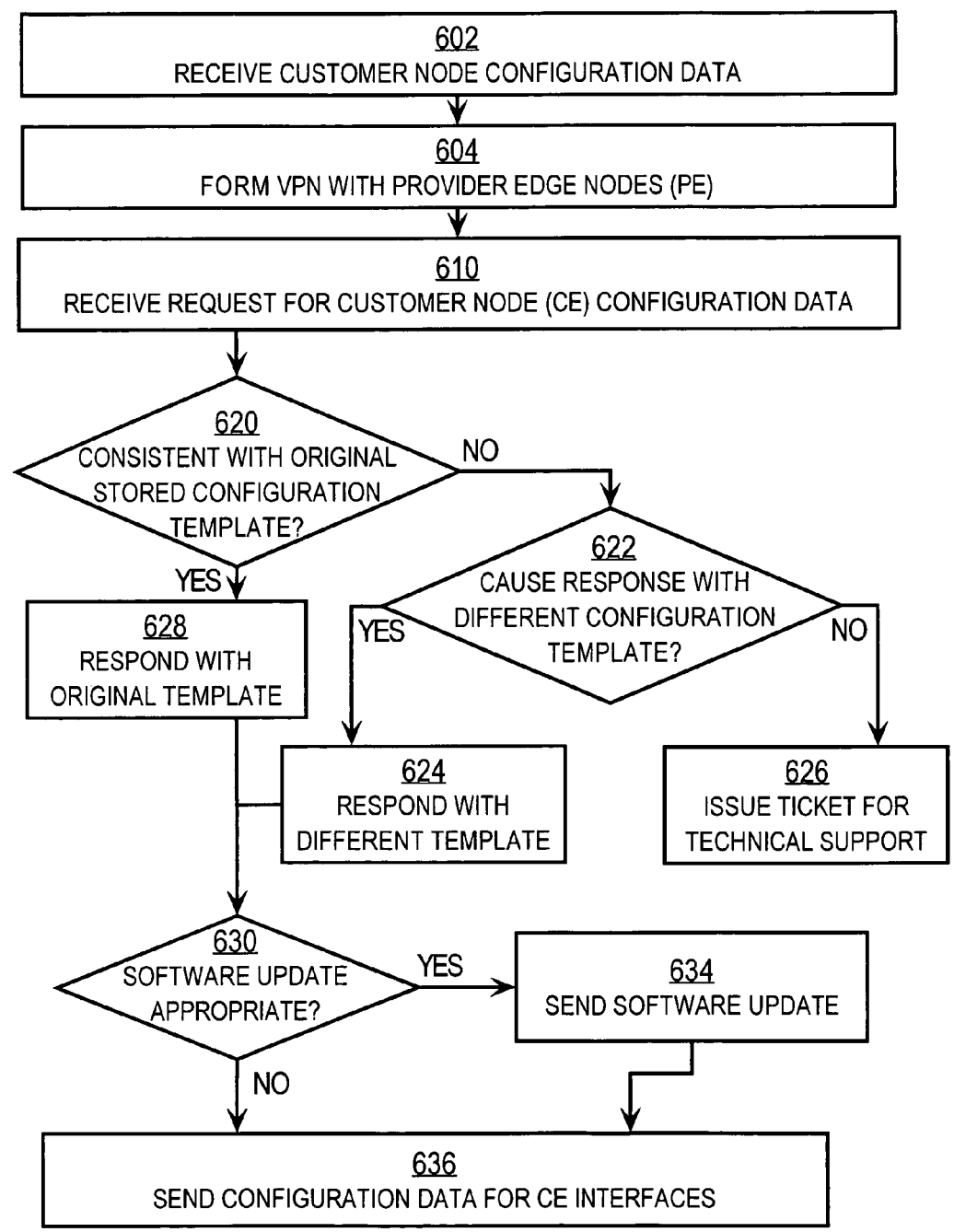
FIG. 6 is a flow diagram that illustrates at a high level a method on a CMS for providing configuration data for a CE node, according to an embodiment.

FIG. 6 is a flow diagram that illustrates at a high level a method 600 on a CMS for providing configuration data for a CE node, according to an embodiment. In step 602, data is received that indicates configuration data for CE nodes for one or more customers. Any method may be used to obtain the configuration data, as described above for receiving data during step 210. Often, the configuration data is derived based in part on customer specifications for the topology for the LAN and level of service—information that is received when the customer subscribes to the service. For example, configuration data is received and stored at provisioning server 130 based on services customer A and customer B subscribed to.

Figure 5:
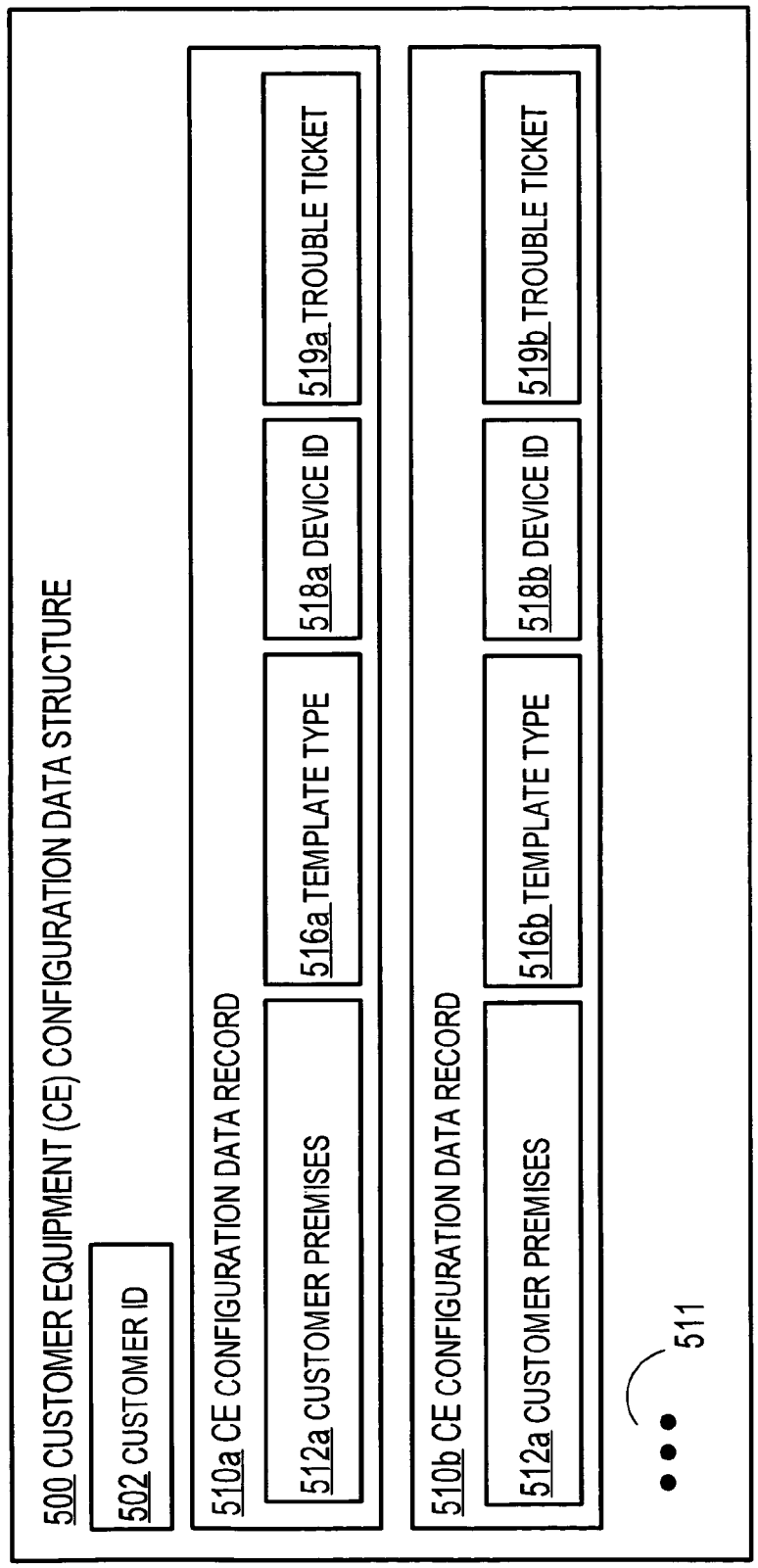
FIG. 5 is a block diagram that illustrates a CE configuration data structure on a configuration management server (CMS), according to an embodiment.

FIG. 5 is a block diagram that illustrates a CE configuration data structure 500 on a configuration management server (CMS), according to an embodiment. Data structure 500 includes a customer ID field 502, two CE configuration data records 510*a*, 510*b* (collectively referenced hereinafter as configuration data records 510) and other fields indicated by ellipsis 511. The other fields indicated by ellipsis 511 include zero or more other customer ID fields and configuration data records 510. In other embodiments, more or fewer fields are used in the CMS configuration data structure. Although the fields are shown as integral entities in a particular order for purposes of illustration, in other embodiments, the data in these fields are spread over multiple different fields in the same or in a different order, in one or more data structures, including one or more local or remote databases.

The customer ID field 502 holds data that uniquely identifies a customer, e.g., customer A. A CMS may hold data for only one customer or for multiple customers. Each customer ID field is followed by one or more CE configuration data records 510, one record for each CE node device used by the customer. After all records for one customer are stored, in the illustrated embodiment, another customer ID field 502 is inserted followed by CE data records for all the CE nodes used by that customer.

Each configuration data record 510 includes data that indicates a particular device serving as a CE node at a particular customer premises and the configuration data for each interface on that device. In the illustrated embodiment, records 510*a*, 510*b* include customer premises fields 512*a*, 512*b*, respectively (collectively referenced hereinafter as customer premises field 512). Records 510*a*, 510*b* also include template type fields 516*a*, 516*b*, respectively (collectively referenced hereinafter as template type field 516). Records 510*a*, 510*b* also include device ID fields 518*a*, 518*b*, respectively (collectively referenced hereinafter as device ID field 518). Records 510*a*, 510*b* also include trouble ticket fields 519*a*, 519*b*, respectively (collectively referenced hereinafter as trouble ticket field 519). In other embodiments, the CE configuration data record includes more or fewer fields.

The customer premises field 512 indicates a particular customer premises where a single CE node is to be configured. In some embodiments the customer premises field 512 is replaced by a PE ID field and PE interface field that hold data that uniquely indicates a PE node and interface that is connected to a particular premises of the customer indicated in the closest preceding customer ID field 502. In such embodiments, the CMS includes data that relates PE node and interfaces with customers and premises.

The template type field 516 holds data that indicates a template of configuration data appropriate for the CE node at the premises for the customer indicated by fields 502 and 512. In some embodiments the template type field 516 holds the actual configuration data. It is expected that the configuration data at many premises managed by the service provider fall into one of a relatively limited set of common configurations. Thus, in the illustrated embodiment, rather than repeat those common combinations, the template type field 516 points to an index into a database of configuration templates. For example, all Cisco 3600 model routers serving as CE nodes for a particular customer are configured in one of a few ways. A template that configures more interfaces than are used at one premises can still be used at that premises, if the interfaces configured match the interfaces used. Templates of configuration data are used in conventional systems in which the CE nodes are pre-configured with the IP address of the CMS server.

The device ID field 518 holds data that indicates a unique identifier for a CE node device, such as the model and serial number. If the CE node ID is known or expected, it is indicated by data in this field. If the CE node ID is not known or anticipated, this field is blank.

The trouble ticket field 519, holds data that indicates a malfunction or discrepancy in the configuration of a CE node that involves the intervention of a system engineer. The trouble ticket field 519 includes data that describes the problem and the status of the remedial actions by the systems engineer. In some embodiments, the trouble ticket is handled by another network management system and data for field 519 is merely communicated to the CMS. In some embodiments, field 519 is omitted.

In step 604 in FIG. 6, a VPN is formed with one or more PE nodes. For example, VPN 132 is formed with PE nodes 120*a*, 120*b* using pseudo wires 132*a*, 132*b*.

In step 610, a request for configuration data for a CE node is received from a PE node. For example, a request 320 as depicted in FIG. 3B is received at CMS 130 over pseudo wire 132*a*. It is assumed for purposes of illustration that the request is from PE node 120*a* based on a request received through interface 123*a* from CE node 150*a*. In this embodiment, the contents of the request are given in Table 1.

TABLE 1

Example partial contents of request received at CMS.

| Field | Content |
|---|---|
| CE node model | Cisco 3800 |
| CE node serial number | ponmlkjihgfedcba |
| CE node software version | IOS a.b |
| CE node interfaces | 0, serial 1, serial 2, serial 3, . . . , Ethernet 1, Ethernet2, . . . |
| PE node ID | 1.2.111.33 |
| PE node interface ID | Serial 4 |
| Customer ID | Customer A |
| Customer premises | Premises 1 |

The contents of the first four fields are based on the contents of the CE node credentials received at the PE node. The contents of the last four fields are provided by the PE node.

In step 620, it is determined whether the request is consistent with the original customer node configuration information stored at the CMS, e.g., in the data structure 500. If so, control passes to step 628; otherwise control passes to step 622.

It is assumed for purposes of illustration that customer A is the customer in field 502, and Premises 1 is the value in the customer premises field 512*a*. If it is determined in step 622 that the contents of device ID field 518*a* matches the device ID "Cisco 3600 ponmlkjihgfedcba" in the request, then the request is consistent with the original stored configuration data, and control passes to step 628. In some embodiments, the device ID field 516*a* is blank. If the device ID field is blank, the original stored configuration data is consistent if the number and type of interfaces on the Cisco model 3600 match the number and type of interfaces configured by the template indicated in the template type field 516*a*. If consistent, flow passes to step 628.

In step 628, the CMS constructs a response message with the configuration data based on the template type indicated in the template type field 516*a*. Control then passes to step 630, described below.

If it is determined in step 620 that the request is not consistent with the original configuration data stored at the CMS, control passes to step 622. It is assumed for purposes of illustration, that the CMS data structure 500 holds data that indicates customer A will use a Cisco 2600 router as CE node 150*a* at Premises 1. For example, the contents of data structure 500 are as specified in Table 2.

TABLE 2

Example partial contents of CE configuration data structure on CMS.

| Field | Contents |
|---|---|
| Customer ID | Customer A |
| Customer Premises | Premises 1 |
| Template type | 2600B |
| Device ID | Model 2600 # xyzabcdefghijklm |
| Trouble ticket | null |

It is further assumed that the request is as specified in Table 1. During step 620, it is determined that the device ID "Model 2600 # xyzabcdefghijklm" expected for premises 1 of customer A is not the same as the device ID "Cisco 3600 ponmlkjihgfedcba" in the request. The request is inconsistent with the stored configuration data, and control then passes to step 622.

In step 622, a CMS administrator is given a choice between a policy to deny the request for configuration due to the mismatch in credentials, or a policy to accept the request but use a pre-defined template configuration profile for that particular customer CE site. If it is determined in step 622 that the CMS administrator chooses to deny the request due to inconsistent credentials, then control passes to step 626 to issue a trouble ticket for technical support for the CE node at this customer premises. In step 626, the ticket is copied into or indexed by data inserted into the trouble ticket field 519*a* for the customer and premises. No response is sent to the request for configuration data. In some embodiments, a response is sent to the PE that the CE's profile did not match with the CE's credentials. In various embodiments, the PE chooses to disable the CE's interface permanently or for some pre-defined time period.

It is here noted that without the extra information provided by the PE node, the CMS would be unable to determine an appropriate template for responding to the request. The request would merely indicate a device ID (Model 3800 # ponmlkjihgfedcba) that is not in the CMS configuration data structure. Neither the device itself nor the CMS knows the customer or premises where the device is located. Only the customer ID field 326 and premises fields added by the PE node (or PE node ID and PE interface ID that substitute for field 512) allow the CMS to identify the customer associated with the device and select an appropriate template to use or modify to respond to the request. Without this extra information, the CMS has as its only recourse to issue a trouble ticket.

In step 630, it is determined whether a software upgrade is appropriate. If so, control passes to step 634 to send the software update. Many methods for sending a software update are known in the art; and any method known at the time an embodiment is implemented may be used. Control then passes to step 636.

It is assumed for purposes of illustration that a software version IOS a.d is available for model 3800 routers serving as CE nodes. In this example, it is determined during step 630 that a software upgrade is appropriated and control passes to step 634 to send the update. Control then passes to step 636.

In step 636, the configuration data response constructed for the CE node interfaces in step 628 or step 624 is sent to the PE node acting as proxy, which sent the request to the CMS and which will forward the response to the CE node over the correct interface using the link layer connection.

Using the method 600, a CMS responds to a request for configuration data even if the device ID is not in the configuration data structure or not related to the correct customer in the data structure.

3.0 Implementation Mechanisms—Hardware Overview

Figure 7:
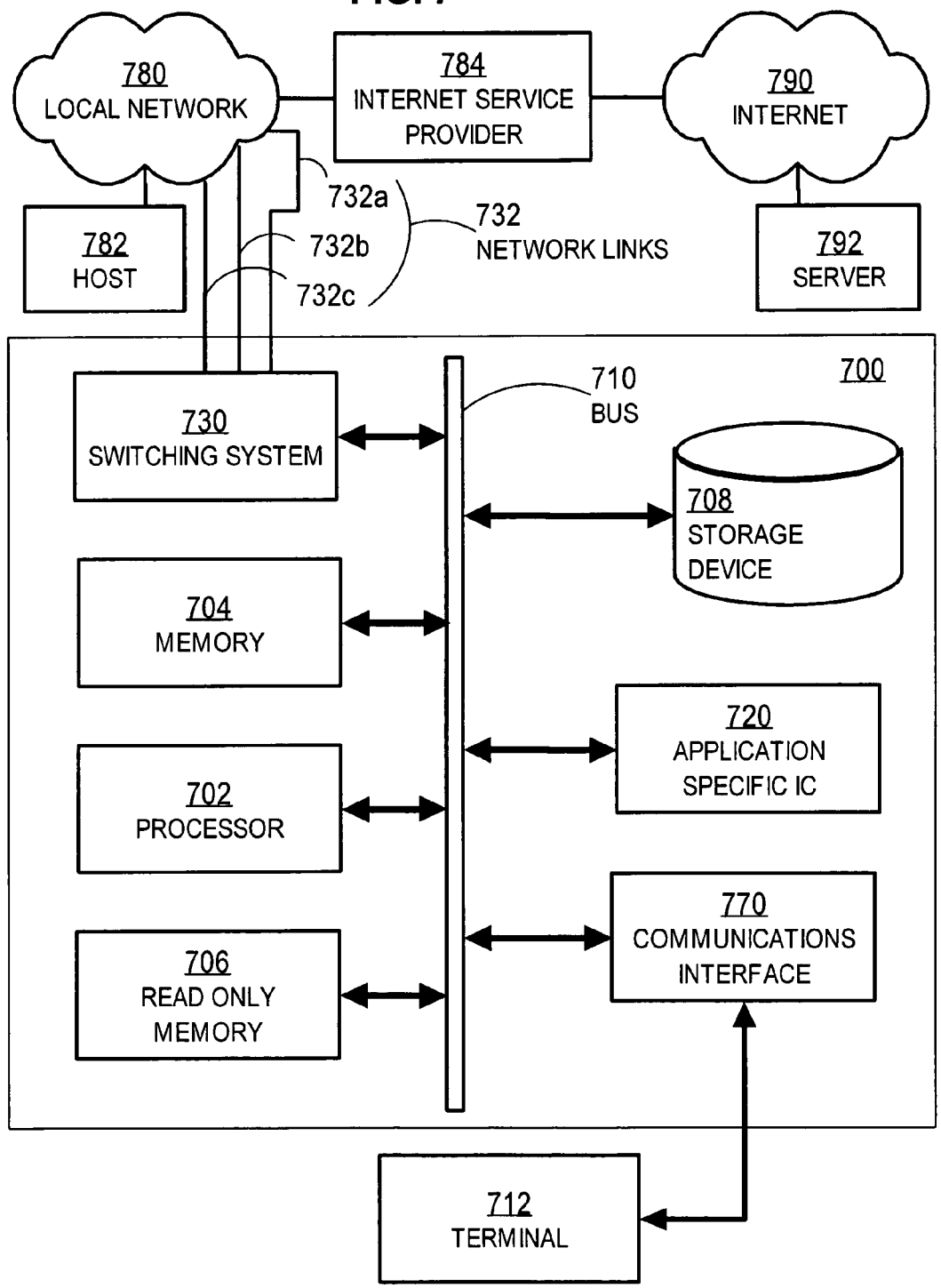
FIG. 7 is a block diagram that illustrates a computer system upon which an embodiment of the invention may be implemented.

FIG. 7 is a block diagram that illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0,1w) of a binary digit (bit). A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitute computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 710 for use by the processor from an external terminal 712, such as a terminal with a keyboard containing alphanumeric keys operated by a human user, or a sensor. A sensor detects conditions in its vicinity and transforms those detections into signals compatible with the signals used to represent information in computer system 700. Other external components of terminal 712 coupled to bus 710, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 712. In some embodiments, terminal 712 is omitted.

Computer system 700 also includes one or more instances of a communications interface 770 coupled to bus 710. Communication interface 770 provides a two-way communication coupling to a variety of external devices that operate with their own processors, such as printers, scanners, external disks, and terminal 712. Firmware or software running in the computer system 700 provides a terminal interface or character-based command interface so that external commands can be given to the computer system. For example, communication interface 770 may be a parallel port or a serial port such as an RS-232 or RS-422 interface, or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 700 includes switching system 730 as special purpose hardware for switching information for flow over a network. Switching system 730 typically includes multiple communications interfaces, such as communications interface 770, for coupling to multiple other devices. In general, each coupling is with a network link 732 that is connected to another device in or attached to a network, such as local network 780 in the illustrated embodiment, to which a variety of external devices with their own processors are connected. In some embodiments an input interface or an output interface or both are linked to each of one or more external network elements. Although three network links 732a, 732b, 732c are included in network links 732 in the illustrated embodiment, in other embodiments, more or fewer links are connected to switching system 730. Network links 732 typically provides information communication through one or more networks to other devices that use or process the information. For example, network link 732b may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides routing information for use with switching system 730.

The switching system 730 includes logic and circuitry configured to perform switching functions associated with passing information among elements of network 780, including passing information received along one network link, e.g. 732a, as output on the same or different network link, e.g., 732c. The switching system 730 switches information traffic arriving on an input interface to an output interface according to pre-determined protocols and conventions that are well known. In some embodiments, switching system 730 includes its own processor and memory to perform some of the switching functions in software. In some embodiments, switching system 730 relies on processor 702, memory 704, ROM 706, storage 708, or some combination, to perform one or more switching functions in software. For example, switching system 730, in cooperation with processor 704 implementing a particular protocol, can determine a destination of a packet of data arriving on input interface on link 732a and send it to the correct destination using output interface on link 732c. The destinations may include host 782, server 792, other terminal devices connected to local network 780 or Internet 790, or other routing and switching devices in local network 780 or Internet 790.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720 and circuits in switching system 730, may be used in place of or in combination with software to implement the invention. Thus, embodiments of the invention are not limited to any specific combination of hardware and software.

The signals transmitted over network link 732 and other networks through communications interfaces such as interface 770, which carry information to and from computer system 700, are exemplary forms of carrier waves. Computer system 700 can send and receive information, including program code, through the networks 780, 790 among others, through network links 732 and communications interfaces such as interface 770. In an example using the Internet 790, a server 792 transmits program code for a particular application, requested by a message sent from computer 700, through Internet 790, ISP equipment 784, local network 780 and network link 732b through communications interface in switching system 730. The received code may be executed by processor 702 or switching system 730 as it is received, or may be stored in storage device 708 or other non-volatile storage for later execution, or both. In this manner, computer system 700 may obtain application program code in the form of a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to an infra-red signal, a carrier wave serving as the network link 732b. An infrared detector serving as communications interface in switching system 730 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702 or switching system 730.

4.0 Extensions and Alternatives

In this specification and Appendix, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:

establishing a physical layer network connection between a particular customer node which is an intermediate network node on a customer premises and a first provider node which is an intermediate network node on a first provider network of a first service provider different from the customer;

sending a first message to indicate credentials for the particular customer node, the credentials including data indicating a model for the particular customer node, data indicating a serial number for the particular customer node, data indicating a version of operating system software instructions used by the particular customer node, and data indicating network interfaces to be configured on the particular customer node, wherein the credentials are used to confirm that the particular customer node is authorized to receive configuration data based on the credentials;

receiving configuration data for one or more network interfaces on the particular customer node through the physical layer network connection with the particular provider node, wherein the configuration data includes an encapsulation parameter, a security parameter, and a class of service parameter that includes a latency characteristic and a bandwidth characteristic; and configuring the particular customer node based on configuration data received through the physical layer network connection, wherein the configuring comprises configuring the one or more network interfaces for communication using the configuration data.

2. A method as recited in claim 1, said step of automatically receiving configuration data further comprising the steps of:

automatically discovering a particular link layer protocol for communicating over the physical layer network connection with a second provider node which is an intermediate network node on a second provider network of a second service provider different from the customer;

automatically sending a configuration request message to the second provider node in a payload of the particular link layer protocol, wherein the message indicates a request for configuration information; and in response to sending the configuration request message, receiving from the second provider node a configuration response message that includes data that indicates configuration data for the one or more interfaces on the particular customer node.

3. A method as recited in claim 2, said step of receiving from the second provider node the configuration response message further comprising the step of receiving from the second provider node the configuration response message based on data received at the second provider node from a configuration management server different from the second provider node, whereby the second provider node is a proxy for the configuration management server.

4. A method as recited in claim 2, wherein the second provider node is the same as the first provider node, whereby the second service provider is the same as the first service provider and the second provider network is the same as the first provider network.

5. A method as recited in claim 1, said step of establishing a physical layer network connection between the particular customer node and the first provider node further comprising replacing a different customer node which is an intermediate network node on the customer premises different from the particular customer node, for which a physical layer connection between the different customer node and the first provider node was previously established.

6. A method, comprising:

receiving data that describes a plurality of discovery messages for a plurality of link layer protocols for communicating between an intermediate network node on a customer premises and an intermediate network node on a provider network of a network service provider;

constructing a test message based on data that describes a first discovery message of the plurality of discovery messages, wherein a first link layer protocol associated with the first discovery message is a link layer protocol of the test message;

sending the test message through a particular network interface on a particular customer node that is an intermediate network node on a customer premises for a particular customer;

determining whether, in response to the test message, a response message that indicates an acknowledgement of the test message according to a link layer protocol of the test message is received from a particular provider node, wherein the particular provider node is an intermediate network node on a provider network of a network service provider different from the particular customer; and if it is determined that the response message that indicates an acknowledgement of the test message according to a link layer protocol of the test message is received from the particular provider node, then sending a first message to indicate credentials for the particular customer node, the credentials including data indicating a model for the particular customer node, data indicating a serial number for the particular customer node, data indicating a version of operating system software instructions used by the particular customer node, and data indicating network interfaces to be configured on the particular customer node;

confirming that the particular customer node is authorized to receive configuration data based on the credentials;

configuring the particular customer node based on configuration data received from the particular provider node, wherein the configuration data includes an encapsulation parameter, a security parameter, and a class of service parameter that includes a latency characteristic and a bandwidth characteristic, wherein the configuring comprises configuring the one or more network interfaces for communication using the configuration data.

7. A method as recited in claim 6, further comprising the steps of:

if it determined that the response message that indicates an acknowledgement of the test message according to a link layer protocol of the test message is not received, then constructing the test message based on data that describes a different second discovery message of the plurality of discovery messages, wherein a second link layer protocol associated with the second discovery message is a link layer protocol of the test message, and repeating said steps of sending the test message and determining whether a response message that indicates an acknowledgement of the test message according to a link layer protocol of the test message is received in response to the test message.

8. A method as recited in claim 7, said step of constructing the test message based on data that describes a different second discovery message further comprising the steps of:

determining whether there is a different discovery message of the plurality of discovery messages yet to be used to construct a test message for the particular interface; and, if it is determined that there is not a different discovery message yet to be used to construct a test message, then sending the test message through a second network interface on the particular customer node, wherein the second network interface is different from the particular network interface.

9. A method as recited in claim 6, further comprising the steps of:

if it is determined that a response message that indicates an acknowledgement of the test message according to a link layer protocol of the test message is not received, then sending the test message through a second network interface on the particular customer node, wherein the second network interface is different from the particular network interface, and repeating said step of determining whether a response message is received in response to the test message.

10. A method as recited in claim 6, said step of configuring the particular customer node based on configuration data received from the particular provider node further comprising the steps of:

sending, to the particular provider node, a request message that indicates a request for configuration information for the particular customer node; and, receiving the configuration data from the particular provider node in response to sending the request message.

11. A method as recited in claim 10, wherein:

said step of sending the request message further comprising sending the request message to the particular provider node according to the link layer protocol of the test message; and, said step of receiving the configuration data further comprising receiving the configuration data from the particular provider node according to the link layer protocol of the test message.

12. A method as recited in claim 6, further comprising the step of, if it is determined that the response message that indicates an acknowledgement of the test message according to a link layer protocol of the test message is received, then receiving, from the particular provider node, management data for traffic between the particular customer node and the provider network.

13. A method as recited in claim 12, said step of receiving management data from the particular provider node further comprising the steps of:

sending to the particular provider node a management request message according to the link layer protocol of the test message; and receiving the management data in a management response message according to the link layer protocol of the test message in response to sending the management request message.

14. A method as recited in claim 12, said step of receiving management data from the particular provider node further comprising determining based on the management data whether to include particular data in a message sent over the provider network; and if it is determined to include the particular data in a message sent over the provider network, then including the particular data in a message sent over the provider network.

15. A method as recited in claim 6, further comprising the steps of:

if it is determined that the response message that indicates an acknowledgement of the test message according to the link layer protocol of the test message is not received, then determining whether a non-acknowledgement message is received that indicates a different link layer protocol from the link layer protocol of the test; and if it is determined that a message is received that indicates the different link layer protocol, then constructing the test message based on data that describes a different second discovery message of the plurality of discovery messages, wherein the protocol associated with the second discovery message is the different link layer and is the link layer protocol of the test message, and repeating said steps of sending the test message and determining whether a response message that indicates an acknowledgement of the test message according to a link layer protocol of the test message is received in response to the test message.

16. A method comprising:

receiving data that associates with a particular customer a particular interface on a particular provider node that is an intermediate network node on an edge of a provider network of a network service provider different from the particular customer;

receiving on the particular interface a message that includes customer node credentials data that indicates a particular customer node that is an intermediate network node on a premises of the particular customer, the credentials including data indicating a model for the particular customer node, data indicating a serial number for the particular customer node, data indicating a version of operating system software instructions used by the particular customer node, and data indicating network interfaces to be configured on the particular customer node;

confirming that the particular customer node is authorized to receive configuration data based on the credentials;

receiving configuration data for one or more interfaces on the particular customer node based on the customer node credentials data and the particular customer associated with the particular interface, wherein the configuration data includes an encapsulation parameter, a security parameter, and a class of service parameter that includes a latency characteristic and a bandwidth characteristic; and sending the configuration data through the particular interface to the particular customer node to configure one or more interfaces on the particular customer node, wherein the credentials include data indicating a model for the particular customer node, data indicating a serial number for the particular customer node, data indicating a version of software instructions used by the particular customer node, and data indicating network interfaces to be configured on the particular customer node, wherein the network interfaces of the particular customer node are configured for communication using the configuration data.

17. A method as recited in claim 16, wherein:

said step of receiving data that associates the particular interface with the particular customer further comprising receiving data that associates a particular customer configuration management server with the particular interface; and said step of receiving configuration data for the particular customer node further comprises the steps of
sending to the particular customer configuration management server a request for configuration data, wherein the request is based in part on the customer credentials data and the request includes data that indicates the particular customer, and
receiving the configuration data for the particular customer node from the customer configuration management server,
whereby the particular provider node is a proxy for the customer configuration management server.

18. A method as recited in claim 16, said step of receiving on the particular interface a message that includes customer node credentials data further comprises:
receiving, over the particular interface from the particular customer node, a discovery message for a particular link layer protocol;
sending a response message that acknowledges the discovery message according to the particular link layer protocol;
receiving the message that includes customer node credentials according to the particular link layer protocol; and
sending the configuration data according to the particular link layer protocol.

19. A method as recited in claim 18, further comprising sending traffic management data that indicates traffic performance measures for traffic between the particular customer node and the provider network to the particular customer node according to the particular link layer protocol.

20. A method as recited in claim 16, said step of receiving on the particular interface a message that includes customer node credentials data further comprises:
receiving, over the particular interface from the particular customer node, a discovery message for a particular link layer protocol;
determining whether the particular link layer protocol matches an expected link layer protocol for the particular interface; and
if is determined that the particular link layer protocol does not match the expected link layer protocol, then sending through the particular interface a message that indicates the expected link layer protocol.

21. A method, comprising:
receiving, at a customer configuration management server, template data that indicates configuration data for a plurality of interfaces on an intermediate network node on a premises of a particular customer, wherein the configuration data includes an encapsulation parameter, a security parameter, and a class of service parameter that includes a latency characteristic and a bandwidth characteristic;
receiving, from a particular provider node on a provider network of a provider different from the particular customer, a configuration request data that indicates
the particular customer, and
a particular device that is to serve as a customer node that is an intermediate network node on a premises of a customer;
determining particular configuration data for the particular device based on the template data and the configuration request data; and
sending the particular configuration data to the particular provider node, whereby the particular provider node is a proxy for the customer configuration management server, wherein prior to the configuring of the particular customer node, a first message is sent to indicate credentials for the particular customer node, the credentials including data indicating a model for the particular customer node, data indicating a serial number for the particular customer node, data indicating a version of operating system software instructions used by the particular customer node, and data indicating network interfaces to be configured on the particular customer node, wherein the credentials are used to confirm that the particular customer node is authorized to receive configuration data based on the credentials and wherein the configuring comprises configuring the one or more network interfaces for communication using the configuration data.

22. A method as recited in claim 21, said step of determining particular configuration data for the particular customer node further comprising:
determining whether the particular device is associated with the particular customer in the template data; and
if the particular device is associated with the particular customer, then sending configuration data based on the template.

23. A method as recited in claim 22, further comprising the step of, if the particular device is not associated with the particular customer, then taking corrective action for configuring the particular device.

24. A method as recited in claim 23, said step of taking corrective action further comprising at least one of:
causing a ticket to be issued for service by a technician on the customer premises;
causing a different template to be associated with the particular customer; and
causing an updated version of software instructions for the particular device to be sent to the device.

25. A method comprising:
receiving, at a provider edge node, data that associates with a particular customer a particular interface on the provider node, wherein a provider edge node is an intermediate network node on an edge of a provider network of a network service provider different from the particular customer;
receiving on the particular interface a message that includes customer node credentials data that indicates a particular customer node that is an intermediate network node on a premises of the particular customer;
receiving, at a customer configuration management server, template data that indicates configuration data for a plurality of interfaces on an intermediate network node on a premises of a particular customer, wherein the configuration data includes an encapsulation parameter, a security parameter, and a class of service parameter that includes a latency characteristic and a bandwidth characteristic;
sending, from the provider node to the customer configuration management server, configuration request data that indicates the particular customer, and
a particular device that is to serve as a customer node that is an intermediate network node on a premises of a customer,
whereby the particular provider node is a proxy for the customer configuration management server;
determining, at the customer configuration management server, particular configuration data for the particular device based on the template data and the configuration request data; and
sending the particular configuration data from the customer configuration management server to the particular provider node, wherein the configuration data is used to configure the particular network node by configuring one or more network interfaces thereof; and sending the configuration data through the particular interface to the particular customer node to configure one or more interfaces on the particular customer node, wherein the credentials include data indicating a model for the particular customer node, data indicating a serial number for the particular customer node, data indicating a version of software instructions used by the particular customer node, and data indicating network interfaces to be configured on the particular customer node and wherein the credentials are used by the customer configuration management server to confirm that the particular customer node is authorized to receive the configuration data based on the credentials.

26. An apparatus, comprising:

means for receiving data that describes a plurality of discovery messages for a plurality of link layer protocols for communicating between an intermediate network node on a customer premises and an intermediate network node on a provider network of a network service provider;

means for constructing a test message based on data that describes a first discovery message of the plurality of discovery messages, wherein a first link layer protocol associated with the first discovery message is a link layer protocol of the test message;

means for sending the test message through a particular network interface on a particular customer node that is an intermediate network node on a customer premises for a particular customer;

means for determining whether, in response to the test message, a response message that indicates an acknowledgement of the test message according to a link layer protocol of the test message is received from a particular provider node, wherein the particular provider node is an intermediate network node on a provider network of a network service provider different from the particular customer; and means for sending a first message to indicate credentials for the particular customer node if it is determined that the response message that indicates an acknowledgement of the test message according to a link layer protocol of the test message is received from the particular provider node, the credentials including data indicating a model for the particular customer node, data indicating a serial number for the particular customer node, data indicating a version of operating system software instructions used by the particular customer node, and data indicating network interfaces to be configured on the particular customer node;

means for confirming that the particular customer node is authorized to receive configuration data based on the credentials;

means for configuring the particular customer node based on configuration data received from the particular provider node if it is determined that the response message that indicates an acknowledgement of the test message according to a link layer protocol of the test message is received from the particular provider node, wherein the configuration data includes an encapsulation parameter, a security parameter, and a class of service parameter that includes a latency characteristic and a bandwidth characteristic, wherein after completion of the configuring of the particular customer node, a first message is sent to indicate credentials for the particular customer node, the credentials including data indicating a model for the particular customer node, data indicating a serial number for the particular customer node, data indicating a version of software instructions used by the particular customer node, and data indicating network interfaces to be configured on the particular customer node.

27. An apparatus, comprising:

means for receiving data that associates with a particular customer a particular interface on a particular provider node that is an intermediate network node on an edge of a provider network of a network service provider different from the particular customer;

means for receiving on the particular interface a message that includes customer node credentials data that indicates a particular customer node that is an intermediate network node on a premises of the particular customer;

means for receiving configuration data for one or more interfaces on the particular customer node based on the customer node credentials data and the particular customer associated with the particular interface; and means for sending the configuration data through the particular interface to the particular customer node to configure one or more interfaces on the particular customer node, wherein the configuration data includes an encapsulation parameter, a security parameter, and a class of service parameter that includes a latency characteristic and a bandwidth characteristic, wherein the credentials include data indicating a model for the particular customer node, data indicating a serial number for the particular customer node, data indicating a version of software instructions used by the particular customer node, and data indicating network interfaces to be configured on the particular customer node and wherein the credentials data is used to confirm that the particular customer node is authorized to receive configuration data based on the credentials.

28. An apparatus, comprising:

means for receiving, at a customer configuration management server, template data that indicates configuration data for a plurality of interfaces on an intermediate network node on a premises of a particular customer, wherein the configuration data includes an encapsulation parameter, a security parameter, and a class of service parameter that includes a latency characteristic and a bandwidth characteristic;

means for receiving, from a particular provider node on a provider network of a provider different from the particular customer, a configuration request data that indicates the particular customer, and a particular device that is to serve as a customer node that is an intermediate network node on a premises of a customer;

means for determining particular configuration data for the particular device based on the template data and the configuration request data; and means for sending the particular configuration data to the particular provider node, whereby the particular provider node is a proxy for the customer configuration management server, wherein prior to the configuring of the particular customer node, a first message is sent to indicate credentials for the particular customer node, the credentials including data indicating a model for the particular customer node, data indicating a serial number for the particular customer node, data indicating a version of operating system software instructions used by the particular customer node, and data indicating network interfaces to be configured on the particular customer node, wherein the credentials are used to confirm that the particular customer node is authorized to receive configuration data based on the credentials and wherein the configuring comprises configuring the one or more network interfaces for communication using the configuration data.

29. An apparatus, comprising:
a provider network interface that is coupled to a provider network for communicating therewith a data packet;
a customer network interface that is coupled to customer premises equipment outside the provider network for communicating therewith a data packet;
one or more processors;
a computer-readable medium; and
one or more sequences of instructions stored in the computer-readable medium, which, when executed by the one or more processors, causes the one or more processors to carry out the steps of:
receiving data that describes a plurality of discovery messages for a plurality of link layer protocols for communicating between an intermediate network node on a customer premises and an intermediate network node on a provider network of a network service provider;
constructing a test message based on data that describes a first discovery message of the plurality of discovery messages, wherein a first link layer protocol associated with the first discovery message is a link layer protocol of the test message;
sending the test message through a particular network interface on a particular customer node that is an intermediate network node on a customer premises for a particular customer;
determining whether, in response to the test message, a response message that indicates an acknowledgement of the test message according to a link layer protocol of the test message is received from a particular provider node, wherein the particular provider node is an intermediate network node on a provider network of a network service provider different from the particular customer;
if it is determined that the response message that indicates an acknowledgement of the test message according to a link layer protocol of the test message is received from the particular provider node, then sending a first message to indicate credentials for the particular customer node, the credentials including data indicating a model for the particular customer node, data indicating a serial number for the particular customer node, data indicating a version of operating system software instructions used by the particular customer node, and data indicating network interfaces to be configured on the particular customer node; and
confirming that the particular customer node is authorized to receive configuration data based on the credentials.

30. An apparatus as recited in claim 29, wherein execution of the one or more sequences of instructions further causes the one or more processors to carry out the steps of:
if it determined that the response message that indicates an acknowledgement of the test message according to a link layer protocol of the test message is not received, then constructing the test message based on data that describes a different second discovery message of the plurality of discovery messages, wherein a second link layer protocol associated with the second discovery message is a link layer protocol of the test message, and
repeating said steps of sending the test message and determining whether a response message that indicates an acknowledgement of the test message according to a link layer protocol of the test message is received in response to the test message.

31. An apparatus as recited in claim 30, said step of constructing the test message based on data that describes a different second discovery message further comprising the steps of:
determining whether there is a different discovery message of the plurality of discovery messages yet to be used to construct a test message for the particular interface; and,
if it is determined that there is not a different discovery message yet to be used to construct a test message, then sending the test message through a second network interface on the particular customer node, wherein the second network interface is different from the particular network interface.

32. An apparatus as recited in claim 29, wherein execution of the one or more sequences of instructions further causes the one or more processors to carry out the steps of:
if it is determined that a response message that indicates an acknowledgement of the test message according to a link layer protocol of the test message is not received, then sending the test message through a second network interface on the particular customer node, wherein the second network interface is different from the particular network interface, and
repeating said step of determining whether a response message is received in response to the test message.

33. An apparatus as recited in claim 29, said step of configuring the particular customer node based on configuration data received from the particular provider node further comprising the steps of:
sending, to the particular provider node, a request message that indicates a request for configuration information for the particular customer node; and,
receiving the configuration data from the particular provider node in response to sending the request message.

34. An apparatus as recited in claim 33, wherein:
said step of sending the request message further comprising sending the request message to the particular provider node according to the link layer protocol of the test message; and,
said step of receiving the configuration data further comprising receiving the configuration data from the particular provider node according to the link layer protocol of the test message.

35. An apparatus as recited in claim 29, wherein execution of the one or more sequences of instructions further causes the one or more processors to carry out the step of, if it is determined that the response message that indicates an acknowledgement of the test message according to a link layer protocol of the test message is received, then receiving, from the particular provider node, management data for traffic between the particular customer node and the provider network.

36. An apparatus as recited in claim 35, said step of receiving management data from the particular provider node further comprising the steps of:
sending to the particular provider node a management request message according to the link layer protocol of the test message; and receiving the management data in a management response message according to the link layer protocol of the test message in response to sending the management request message.

37. An apparatus as recited in claim 35, said step of receiving management data from the particular provider node further comprising determining based on the management data whether to include particular data in a message sent over the provider network; and if it is determined to include the particular data in a message sent over the provider network, then including the particular data in a message sent over the provider network.

38. An apparatus as recited in claim 29, wherein execution of the one or more sequences of instructions further causes the one or more processors to carry out the steps of:
if it determined that the response message that indicates an acknowledgement of the test message according to the link layer protocol of the test message is not received, then
determining whether a non-acknowledgement message is received that indicates a different link layer protocol from the link layer protocol of the test; and
if it is determined that a message is received that indicates the different link layer protocol, then
constructing the test message based on data that describes a different second discovery message of the plurality of discovery messages, wherein the protocol associated with the second discovery message is the different link layer and is the link layer protocol of the test message, and
repeating said steps of sending the test message and determining whether a response message that indicates an acknowledgement of the test message according to a link layer protocol of the test message is received in response to the test message.

39. An apparatus, comprising:
a provider network interface that is coupled to a provider network for communicating therewith a data packet;
a customer network interface that is coupled to customer premises equipment outside the provider network for communicating therewith a data packet;
one or more processors;
a computer-readable medium; and
one or more sequences of instructions stored in the computer-readable medium, which, when executed by the one or more processors, causes the one or more processors to carry out the step of:
receiving data that associates with a particular customer a particular interface on a particular provider node that is an intermediate network node on an edge of a provider network of a network service provider different from the particular customer;
receiving on the particular interface a message that includes customer node credentials data that indicates a particular customer node that is an intermediate network node on a premises of the particular customer, the credentials including data indicating a model for the particular customer node, data indicating a serial number for the particular customer node, data indicating a version of operating system software instructions used by the particular customer node, and data indicating network interfaces to be configured on the particular customer node;
confirming that the particular customer node is authorized to receive configuration data based on the credentials;
receiving configuration data for one or more interfaces on the particular customer node based on the customer node credentials data and the particular customer associated with the particular interface, wherein the configuration data includes an encapsulation parameter, a security parameter, and a class of service parameter that includes a latency characteristic and a bandwidth characteristic; and
sending the configuration data through the particular interface to the particular customer node to configure one or more interfaces on the particular customer node, wherein the credentials include data indicating a model for the particular customer node, data indicating a serial number for the particular customer node, data indicating a version of software instructions used by the particular customer node, and data indicating network interfaces to be configured on the particular customer node, wherein the network interfaces of the particular customer node are configured for communication using the configuration data.

40. An apparatus as recited in claim 39, wherein:
said step of receiving data that associates the particular interface with the particular customer further comprising receiving data that associates a particular customer configuration management server with the particular interface; and
said step of receiving configuration data for the particular customer node further comprises the steps of
sending to the particular customer configuration management server a request for configuration data, wherein the request is based in part on the customer credentials data and the request includes data that indicates the particular customer, and
receiving the configuration data for the particular customer node from the customer configuration management server,
whereby the particular provider node is a proxy for the customer configuration management server.

41. An apparatus as recited in claim 39, said step of receiving on the particular interface a message that includes customer node credentials data further comprises:
receiving, over the particular interface from the particular customer node, a discovery message for a particular link layer protocol;
sending a response message that acknowledges the discovery message according to the particular link layer protocol;
receiving the message that includes customer node credentials according to the particular link layer protocol; and
sending the configuration data according to the particular link layer protocol.

42. An apparatus as recited in claim 41, wherein execution of the one or more sequences of instructions further causes the one or more processors to carry out the step of sending traffic management data that indicates traffic performance measures for traffic between the particular customer node and the provider network to the particular customer node according to the particular link layer protocol.

43. An apparatus as recited in claim 39, said step of receiving on the particular interface a message that includes customer node credentials data further comprises:
receiving, over the particular interface from the particular customer node, a discovery message for a particular link layer protocol;
determining whether the particular link layer protocol matches an expected link layer protocol for the particular interface; and if is determined that the particular link layer protocol does not match the expected link layer protocol, then sending through the particular interface a message that indicates the expected link layer protocol.

44. An apparatus for configuring, on customer premises, an intermediate network node in communication with a provider network, comprising:
a provider network interface that is coupled to a provider network for communicating therewith a data packet;
one or more processors;
a computer-readable medium; and
one or more sequences of instructions stored in the computer-readable medium, which, when executed by the one or more processors, causes the one or more processors to carry out the step of:
receiving template data that indicates configuration data for a plurality of interfaces on an intermediate network node on a premises of a particular customer, wherein the configuration data includes an encapsulation parameter, a security parameter, and a class of service parameter that includes a latency characteristic and a bandwidth characteristic;
receiving, from a particular provider node on a provider network of a provider different from the particular customer, a configuration request data that indicates the particular customer, and
a particular device that is to serve as a customer node that is an intermediate network node on a premises of a customer;
determining particular configuration data for the particular device based on the template data and the configuration request data; and
sending the particular configuration data to the particular provider node, whereby the particular provider node is a proxy for the customer configuration management server, wherein prior to the configuring of the particular customer node, a first message is sent to indicate credentials for the particular customer node, the credentials including data indicating a model for the particular customer node, data indicating a serial number for the particular customer node, data indicating a version of operating system software instructions used by the particular customer node, and data indicating network interfaces to be configured on the particular customer node, wherein the credentials are used to confirm that the particular customer node is authorized to receive configuration data based on the credentials and wherein the configuring comprises configuring the one or more network interfaces for communication using the configuration data.

45. An apparatus as recited in claim 44, said step of determining particular configuration data for the particular customer node further comprising:
determining whether the particular device is associated with the particular customer in the template data; and
if the particular device is associated with the particular customer, then sending configuration data based on the template.

46. An apparatus as recited in claim 45, wherein execution of the one or more sequences of instructions further causes the one or more processors to carry out the step of, if the particular device is not associated with the particular customer, then taking corrective action for configuring the particular device.

47. An apparatus as recited in claim 46, said step of taking corrective action further comprising at least one of:
causing a ticket to be issued for service by a technician on the customer premises;
causing a different template to be associated with the particular customer; and
causing an updated version of software instructions for the particular device to be sent to the device.

48. A system, comprising:
a computer readable medium for a customer node which is an intermediate network node on a customer premises of a customer, wherein the customer node is communicatively connected to a provider network of a network service provider that is different from the customer;
a provider edge node which is an intermediate network node on an edge of the provider network closest to the customer premises; and
a configuration management server on the provider network, which contains configuration data for intermediate network nodes on the customer premises, wherein the configuration data includes an encapsulation parameter, a security parameter, and a class of service parameter that includes a latency characteristic and a bandwidth characteristic, and wherein the computer readable medium stores one or more sequences of instructions, which, when executed by one or more processors on the customer node, causes the one or more processors to perform the steps of discovering a link layer connection with the provider edge node,
sending a first request for configuration data to the provider edge node through the link layer connection, and
configuring interfaces on the customer node based on a response received through the link layer connection using the configuration data;
the provider edge node performs as a proxy for the configuration management server, whereby the provider edge node performs the steps of
sending a second request based on the first request to the configuration management server, and
forwarding a response from the configuration management server to the customer node; and
the configuration management server performs the steps of receiving the second request, and
in response to receiving the second request, sending configuration data for the customer node to the provider edge node for forwarding to the customer node, wherein prior to-completion of the configuring of the particular customer node, a first message is sent to indicate credentials for the particular customer node, the credentials including data indicating a model for the particular customer node, data indicating a serial number for the particular customer node, data indicating a version of software instructions used by the particular customer node, and data indicating network interfaces to be configured on the particular customer node, wherein the credentials are used to confirm that the particular customer node is authorized to receive configuration data based on the credentials.

49. A system as recited in claim 48, wherein:
said step of sending the second request by the provider edge node further comprises sending data that indicates the customer premises; and
said step of sending configuration data for the customer node by the configuration management server further comprises sending configuration data based at least in part on the customer premises.

* * * * *